United States Patent [19]

Moriguchi et al.

[11] Patent Number: 4,844,506
[45] Date of Patent: Jul. 4, 1989

[54] STABILIZER CONTROL SYSTEM

[75] Inventors: Koichi Moriguchi, Nagoya; Yuichi Imani, Hamamatsu; Tetsuji Kozaki, Nagoya, all of Japan

[73] Assignee: Nippondenso Co., Ltd., Kariya, Japan

[21] Appl. No.: 14,614

[22] Filed: Feb. 13, 1987

[30] Foreign Application Priority Data

Feb. 17, 1986 [JP] Japan .................................. 61-32498
Feb. 17, 1986 [JP] Japan .................................. 61-32499
Oct. 13, 1986 [JP] Japan .................................. 61-242804

[51] Int. Cl.⁴ ...................... B60G 17/02; B60G 21/04
[52] U.S. Cl. .................................. 280/689; 280/707; 364/424.01
[58] Field of Search ............... 280/664, 665, 689, 692, 280/693, 695, 697, 700, 707, 710, 721, 722, 723, 714; 364/424

[56] References Cited

U.S. PATENT DOCUMENTS

| 3,065,976 | 11/1962 | Vogel | 280/692 |
|---|---|---|---|
| 3,404,899 | 10/1968 | Vogel | 280/693 |
| 4,050,704 | 9/1977 | Duca et al. | 280/707 |
| 4,066,278 | 1/1978 | Takagi | 280/710 |
| 4,613,153 | 9/1986 | Shibahata | 280/689 |
| 4,618,156 | 10/1986 | Kato et al. | 280/707 |
| 4,624,478 | 11/1986 | Ohtagaki | 280/714 |
| 4,625,994 | 12/1986 | Tanaka et al. | 280/707 |
| 4,632,423 | 12/1986 | Tanahashi | 280/665 |
| 4,641,856 | 2/1987 | Reichenbach | 280/700 |
| 4,697,237 | 9/1987 | Tanaka et al. | 280/707 |

FOREIGN PATENT DOCUMENTS

| 0218120 | 4/1987 | European Pat. Off. . | |
| 2536019 | 5/1984 | France . | |
| 51-131024 | 11/1976 | Japan . | |
| 57-66009 | 4/1982 | Japan . | |
| 59-62008 | 4/1984 | Japan . | |
| 60-60023 | 4/1985 | Japan . | |
| 60-113712 | 6/1985 | Japan . | |
| 60-169314 | 9/1985 | Japan . | |
| 193910 | 8/1986 | Japan | 280/707 |
| 166105 | 7/1987 | Japan | 280/707 |
| 2006131 | 5/1979 | United Kingdom | 280/689 |

Primary Examiner—Charles A. Marmor
Assistant Examiner—Karin L. Ferriter
Attorney, Agent, or Firm—Cushman, Darby & Cushman

[57] ABSTRACT

A vehicle has a body, a right-hand wheel, and a left-hand wheel. A first device rotatably connects the right-hand wheel to the body. A second device rotatably connects the left-hand wheel to the body. An elastically deformable stabilizer is connected between the first and second devices. A mechanism serves to positively deform the stabilizer. A sensor may detect an operating condition of the vehicle, such as a steering condition or speed of the vehicle. The stabilizer may be positively deformed in accordance with the detected operating condition of the vehicle.

19 Claims, 18 Drawing Sheets

STABILIZER CONTROL SYSTEM

BACKGROUND OF THE INVENTION

1. Field of the Invention

This invention relates to a stabilizer for an automotive vehicle, and more particularly to a controllable stabilizer.

2. Description of the Prior Art

Automotive vehicles of the independent suspension type are generally equipped with stabilizers to reduce inclination or roll of the vehicle bodies during such conditions as turns of the vehicles. The stabilizer is usually connected between the suspension arms of the left-hand and right-hand vehicle wheels. When the left-hand and right-hand wheels are in similar positions with respect to the suspensions, the stabilizer does not twist so that the suspensions are mutually independent. When one of the left-hand wheel and the right-hand wheel passes over a projection on the road surface, or when the vehicle turns and thus the left-hand wheel and the right-hand wheel assume considerably different positions with respect to the suspensions, a torsion bar in the stabilizer is twisted. The reaction of the twisted torsion bar induces a torsional resilient force in the direction of cancelling the twist of the torsion bar so that the positions of the two wheels with respect to the suspensions are equalized. The function of the stabilizer affects the rolling characteristic of the vehicle and the road-surface-following characteristic of the vehicle wheels.

In a typical stabilizer, the rolling characteristic of the vehicle is incompatible with the road-surface-following characteristic of the vehicle wheels. Accordingly, a compromise is performed in setting these two characteristics. In other words, these two characteristics are set to compromised fixed levels respectively.

It is desirable that the torsional resilient force in the stabilizer can be adjusted in accordance with running or travelling conditions of the vehicle. Specifically, it is desirable to reduce the torsional rigidity during straight travel of the vehicle and to increase the torsional rigidity during turn of the vehicle. It should be noted that the reduced torsional rigidity enhances the road-surface-following characteristic of the vehicle wheels while the increased torsional rigidity enhances the rolling characteristic of the vehicle.

Japanese published unexamined patent application No. 57-66009 discloses an automotive stabilizer control system including a hydraulic cylinder provided to the connection of a stabilizer to a suspension arm. The hydraulic cylinder has a movable piston, and two pressure chambers at opposite ends of the piston. A bypass passage connects these two pressure chambers. A check valve selectively blocks and unblocks the bypass passage. When the check valve blocks the bypass passage, the hydraulic cylinder assumes a rigid state which induces a great torsional rigidity of the stabilizer. When the check valve unblocks the bypass passage, the hydraulic cylinder assumes an easily deformable state which induces a small torsional rigidity of the stabilizer. The check valve responds to a hydraulic pressure which drives a power steering apparatus. The power steering hydraulic pressure depends on whether the vehicle is running straight or turning. When the vehicle is running straight, the check valve unblocks the bypass passage so that a small torsional rigidity of the stabilizer is induced. When the vehicle is turning, the check valve blocks the bypass passage so that a great torsional rigidity of the stabilizer is induced. This prior-art stabilizer control system therefore provides only rudimental control.

SUMMARY OF THE INVENTION

It is an object of this invention to provide a sophisticated and advanced stabilizer control system.

It is another object of this invention to provide a vehicle control system which effectively reduces or prevents roll of the vehicle.

In accordance with a first aspect of this invention, an elastically deformable stabilizer is connected between a first device and a second device. The first device rotatably connects a vehicle right-hand wheel to a vehicle body. The second device rotatably connects a vehicle left-hand wheel to the vehicle body. A mechanism serves to positively deform the stabilizer.

In accordance with a second aspect of this invention, an elastically twistable stabilizer is connected between a first spring lower member and a second spring lower member. The first spring lower member is connected to a vehicle right-hand wheel. The second spring lower member is connected to a vehicle left-hand wheel. A hydraulic actuator is connected to a pressurized hydraulic fluid source. The actuator is connected between the stabilizer and at least one of the spring lower members. When the pressurized fluid is supplied to the actuator, the actuator twists the stabilizer. When the pressurized fluid is not supplied to the actuator, the actuator can disconnect the first and second spring lower members. A sensor detects a travelling condition of the vehicle. A determination is made as to whether the vehicle is travelling essentially straight or turning in accordance with the detected vehicle travelling condition. When the vehicle is turning, the pressurized fluid is supplied to the actuator to repress roll of the vehicle. When the vehicle is travelling essentially straight, the supply of the pressurized fluid to the actuator is interrupted to disconnect the first and second spring lower members.

In accordance with a third aspect of this invention, an elastically twistable stabilizer is connected between a first spring lower member and a second spring lower member. The stabilizer has a portion transmitting a torsional force. The first spring lower member is connected to a vehicle right-hand wheel. The second spring lower member is connected to a vehicle left-hand wheel. A hydraulic cylinder unit is connected to a pressurized hydraulic fluid source. The cylinder unit is connected between the torsional-force-transmission portion of the stabilizer and at least one of the spring lower members. The cylinder unit can be expanded and contracted when the cylinder unit is supplied with the pressurized fluid. The cylinder unit can be free to move when the cylinder is not supplied with the pressurized fluid. A sensor detects a travelling condition of the vehicle. A determination is made as to whether the vehicle is travelling straight or turning in accordance with the detected vehicle travelling condition. When the vehicle is travelling straight, supply of the pressurized fluid to the cylinder unit is controlled to repress roll of the vehicle. When the vehicle is turning, the supply of the pressurized fluid to the cylinder unit is interrupted to produce free movement of the cylinder unit.

In accordance with a fourth aspect of this invention, an elastically twistable stabilizer is connected between a first spring lower member and a second spring lower member. The stabilizer has a portion transmitting a torsional force. The first spring lower member is connected to a vehicle right-hand wheel. The second spring lower member is connected to a vehicle left-hand wheel. A hydraulic cylinder unit is connected to a pressurized hydraulic fluid source. The cylinder unit is connected to the torsional-force-transmission portion of the stabilizer and at least one of the spring lower members. The cylinder unit includes a cylinder and a piston movably disposed within the cylinder. The piston divides an interior of the cylinder into a first chamber and a second chamber. A distance between the spring lower member and the torsional-force-transmission portion of the stabilizer is adjustable in accordance with movement of the piston. A first hydraulic line connects the pressurized fluid source and the first chamber of the cylinder unit. A second hydraulic line connects the pressurized fluid source and the second chamber of the cylinder unit. A third hydraulic line connects the first and second chambers of the cylinder unit. A change-over valve provided in the first and second lines is changeable among an expansion mode position, a neutral mode position, and a contraction mode position. The cylinder unit expands and contracts when the change-over valve assumes the expansion mode position and the contraction mode position respectively. The cylinder unit can be fixed when the change-over valve assumes the neutral position. A connection-disconnection valve provided in the third line blocks and unblocks the third line. A sensor detects speed of the vehicle. A sensor detects steering angle of the vehicle. The change-over valve and the connection-disconnection valve are controlled in accordance with the detected vehicle speed and the detected vehicle steering angle.

In accordance with a fifth aspect of this invention, an elastically twistable stabilizer is connected between a first spring lower member and a second spring lower member. The first spring lower member is connected to a vehicle right-hand wheel. The second spring lower member is connected to a vehicle left-hand wheel. A single-rod-type hydraulic actuator has a first chamber and a second chamber. The actuator twists the stabilizer in accordance with pressures in the first and second chambers. A change-over valve supplies pressurized hydraulic fluid from a source to either of the first and second chambers of the actuator. A flow adjustment valve is changeable between a connection mode position and a disconnection mode position. The flow adjustment valve connects the first and second chambers of the actuator to each other and connects the first and second chambers of the actuator to a low pressure side when the flow adjustment valve assumes the connection mode position. The flow adjustment valve disconnects the first and second chambers of the actuator from each other and disconnects the first and second chambers of the actuator from the low pressure side when the flow adjustment valve assumes the disconnection mode position. The flow adjustment valve gradually changes between the connection mode position and the disconnection mode position during adjustment of flows of the hydraulic fluid from and to the actuator.

DESCRIPTION OF THE FIRST PREFERRED EMBODIMENT

Figure 1:
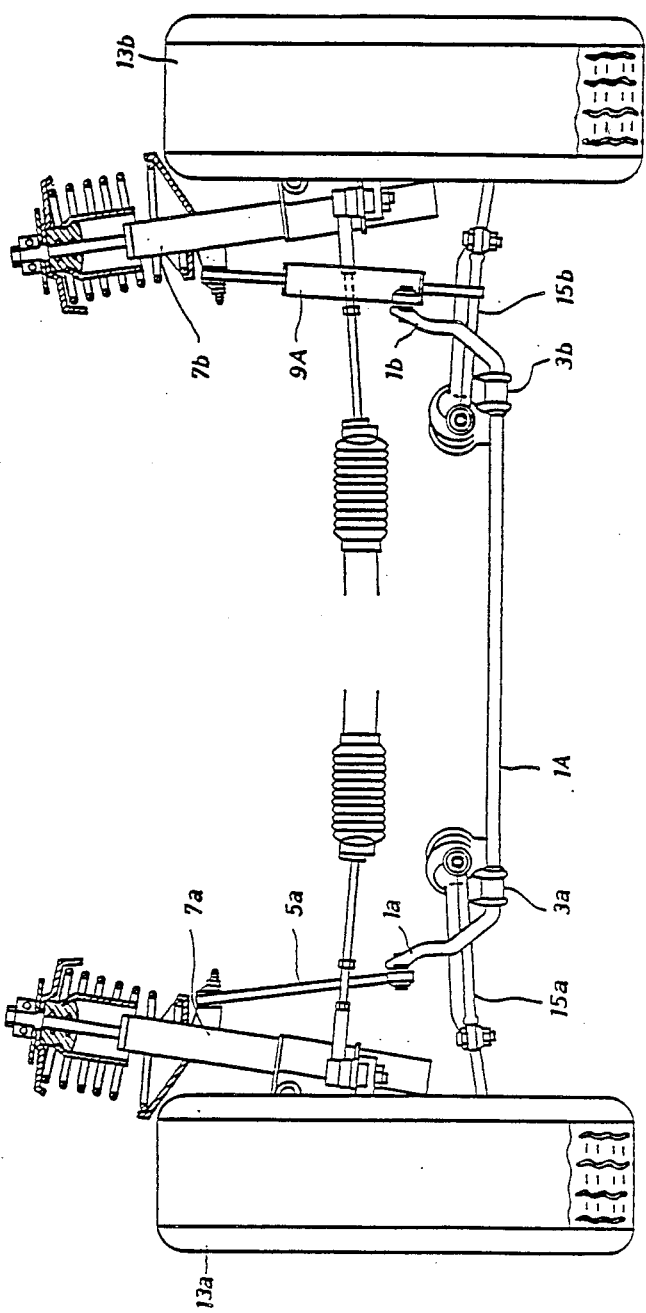
FIG. 1 is a diagram of a front portion of an automotive vehicle equipped with a stabilizer control system according to a first embodiment of this invention.

With reference to FIG. 1, an automotive vehicle has a front U-shaped sway bar or stabilizer 1A rotatably supported on a vehicle body by rubber bearings 3a and 3b. The stabilizer 1A includes opposite ends 1a and 1b, and an elastically deformable or twistable torsion segment extending between the ends 1a and 1b. The ends 1a and 1b serve to transmit a torsional force to and from the torsion segment. One end 1a of the stabilizer 1A is connected to a spring lower member, such as a strut portion 7a of a shock absorber, via a tie rod 5a. The end 1a of the stabilizer 1A may be connected to a suspension arm. The other end 1b of the stabilizer 1A is connected to a spring lower member, such as a strut portion 7b of a shock absorber, via a hydraulic cylinder unit 9A. The end 1b of the stabilizer 1A may be connected to a suspension arm via the cylinder unit 9A. A front vehicle wheel 13a is connected to the vehicle body via a lower arm 15a and the strut portion 7a. An opposite front vehicle wheel 13b is connected to the vehicle body via a lower arm 15b and the strut portion 7b.

Figure 2:
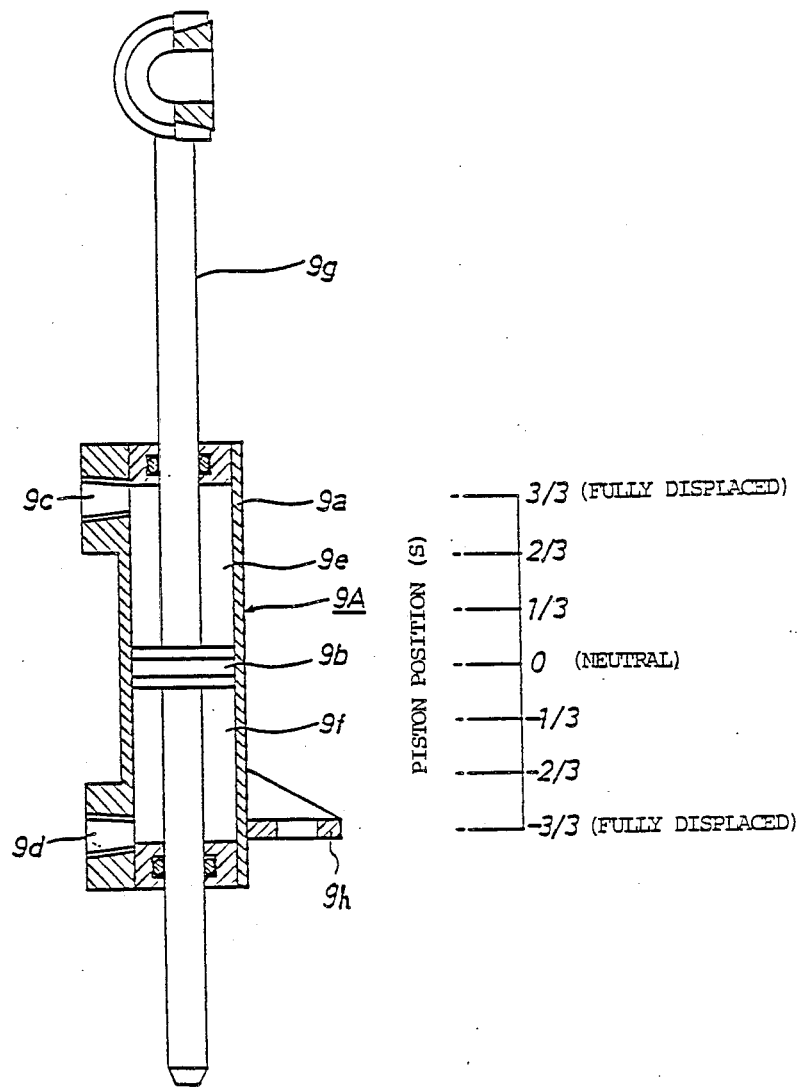
FIG. 2 is a sectional view of the hydraulic cylinder unit of FIG. 1.

As shown in FIG. 2, the hydraulic cylinder unit 9A includes a hollow cylinder 9a accommodating a slidable piston 9b. The interior of the cylinder 9a is divided by the piston 9b into an upper chamber 9e and a lower chamber 9f. An upper port 9c extending radially through the wall of the cylinder 9a opens into the upper chamber 9e. Working hydraulic fluid or oil is movable into and out of the upper chamber 9e via the upper port 9c. A lower port 9d extending radially through the wall of the cylinder 9a opens into the lower chamber 9f. Working hydraulic fluid or oil is movable into and out of the lower chamber 9f via the lower port 9d. A rod 9g fixed to the piston 9b extends coaxially through the cylinder 9a. The piston 9b and the piston rod 9g move relative to the cylinder 9a in accordance with the difference in pressure between the upper and lower chambers 9e and 9f. An end of the piston rod 9g is connected to the strut portion 7b (see FIG. 1). The cylinder 9a is connected via a bracket 9h to the end 1b of the stabilizer 1A (see FIG. 1). As the piston rod 9g moves upward relative to the cylinder 9a, the effective length of the cylinder unit 9A increases and also the effective distance between the stabilizer end 1b and the strut portion 7b increases. As the piston rod 9g moves downward relative to the cylinder 9a, the effective length of the cylinder unit 9A decreases and also the effective distance between the stabilizer end 1b and the strut portion 7b decreases. Since the stabilizer 1A is twisted in accordance with the effective distance between the stabilizer end 1b and the strut portion 7b, the torsional rigidity of the stabilizer 1A depends on the effective length of the cylinder unit 9A. As will be made clear hereinafter, the cylinder unit 9A is controlled to adjust the characteristic of the torsional rigidity of the stabilizer 1A. In addition, the cylinder unit 9A serves to selectively enable and disable the stabilizer 1A.

It should be noted that the piston rod 9g may be connected to the stabilizer end 1b. In this case, the cylinder 9a is connected to the strut portion 7b.

The automotive vehicle has a rear stabilizer (not shown) designed in a manner similar to the front stabilizer 1A except for the following point. The stiffness or rigidity of the rear stabilizer is set normally smaller than that of the front stabilizer. A rear hydraulic cylinder unit 9B (see FIG. 3) has an internal design similar to that of the front cylinder unit 9A. The rear cylinder unit 9B is connected between the rear stabilizer and a member of a rear wheel suspension in a way similar to the connection of the front cylinder unit 9A.

Figure 3:
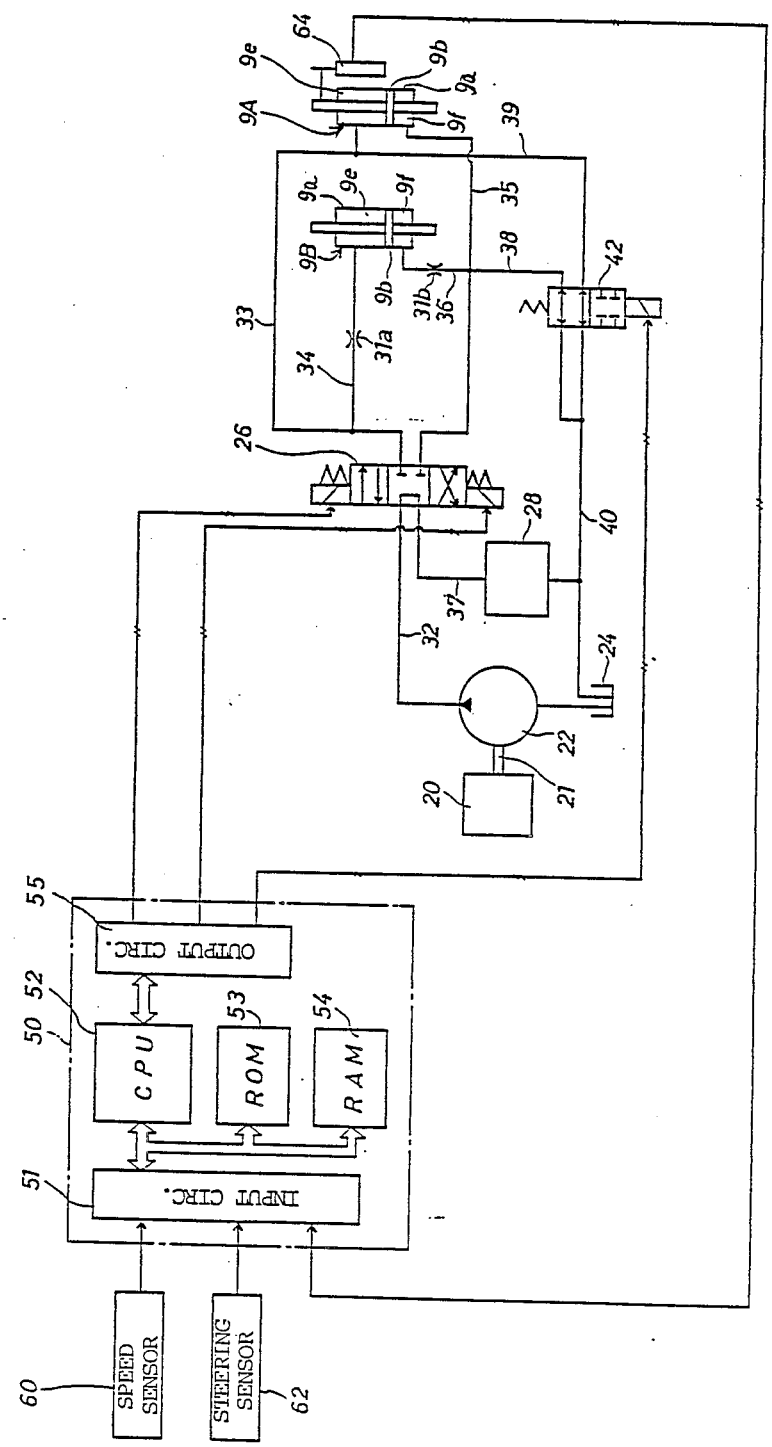
FIG. 3 is a schematic diagram of the stabilizer control system of the first embodiment of this invention.

As shown in FIG. 3, an automotive engine 20 has a crankshaft or output shaft 21 connected to a hydraulic pump 22. The engine 20 powers the hydraulic pump 22. It should be noted that the engine output shaft 21 is also connected to the vehicle driving wheels to allow the engine 20 to power the driving wheels. The inlet of the hydraulic pump 22 is connected to an oil reservoir 24. The outlet of the hydraulic pump 22 is connected to the front cylinder unit 9A and the rear cylinder unit 9B via lines 32-36, and via a change-over solenoid valve 26 of the four-port three-position type. The outlet of the hydraulic pump 22 is also connected to a power steering apparatus 28 via the line 32, the change-over valve 26, and a line 37. The power steering apparatus 28 is connected to the reservoir 24. The hydraulic pump 22 draws hydraulic fluid or oil from the reservoir 24 and supplies pressurized oil to the front cylinder unit 9A and the rear cylinder unit 9B via the lines 32-36 and the change-over valve 26. The hydraulic pump 22 also supplies the pressurized oil to the power steering apparatus 28 via the lines 32 and 37, and the change-over valve 26. The upper and lower chambers 9e and 9f of the front cylinder unit 9A are mutually connected via lines 38 and 39, and via a connection-disconnection solenoid valve 42 of the four-port two-position type. The upper and lower chambers 9e and 9f of the rear cylinder unit 9B are mutually connected via the lines 38 and 39, and via the connection-disconnection valve 42. The upper and lower chambers 9e and 9f of the cylinder units 9A and 9B are connected to the reservoir 24 via the lines 38 and 39, a line 40, and the connection-disconnection valve 42. The lines 34 and 36 directly connected to the rear cylinder unit 9B are provided with restrictions or throttled portions 31a and 31b to compensate for the weaker stiffness of the rear stabilizer than the stiffness of the front stabilizer 1A.

An electronic control unit 50 including a microcomputer is electrically connected to the change-over valve 26 and the connection-disconnection valve 42. The control unit 50 outputs electrical control signals to the solenoid valves 26 and 42. The solenoid valve 26 changes among a neutral mode position, an expansion mode position, and a contraction mode position in accordance with the signal from the control unit 50. The solenoid valve 42 changes between a connection mode position and a disconnection mode position.

A speed sensor 60 generates an electrical signal representative of the speed of the vehicle which is outputted to the control unit 50 via an electrical connection between the elements 50 and 60. A steering sensor 62 generates an electrical signal representing the vehicle steering angle, that is, the operated angle or angular position of a vehicle steering wheel. This steering angle signal is transmitted to the control unit 50 via an electrical connection between the elements 50 and 62. A position sensor 64 connected to the front cylinder unit 9A generates an electrical signal representing the position of the piston 9b of the unit 9A relative to the cylinder 9a of the unit 9A. This position signal is transmitted to the control unit 50 via an electrical connection between the elements 50 and 64.

The control unit 50 adjusts the control signals to the change-over valve 26 and the connection-disconnection valve 42 in accordance with the signals from the sensors 60, 62, and 64 by referring to a preset program. The control unit 50 includes a microcomputer system having the combination of an input circuit 51, a central processing unit (CPU) 52, a read-only memory (ROM) 53, a random-access memory (RAM) 54, and an output circuit 55. The signals from the sensors 60, 62, and 64 are inputted into the control unit 50 via the circuit 51. The control unit 50 outputs the control signals to the solenoid valves 26 and 42 via the circuit 55. The ROM 53 holds a program operating the control unit 50. During signal processing operation in the control unit 50, the RAM 54 temporarily holds data and signals.

In operation, when the vehicle is travelling straight, the change-over valve 26 is held in the neutral mode position and the connection-disconnection valve 42 is held in the connection mode position. When the change-over valve 26 is in the neutral mode position, the cylinder units 9A and 9B are disconnected from the hydraulic pump 22 but the power steering apparatus 28 is connected to the hydraulic pump 22 so that the pressurized oil from the hydraulic pump 22 is supplied only to the power steering apparatus 28 via the lines 32 and 37. When the connection-disconnection valve 42 is in the connection mode position, the upper and lower chambers 9e and 9f of each of the cylinder units 9A and 9B communicate with each other via the lines 33-36, 38, and 39 so that the pistons 9b are free to move relative to the cylinders 9a. Accordingly, when the vehicle is travelling straight, the pistons 9b freely move in accordance with torsional forces transmitted from the front and rear stabilizers so that the stabilizers are prevented from exhibiting their intrinsic rigidities and are forced to exhibit only negligible or small effective rigidities. In other words, the stabilizers are disabled. The small effective rigidities of the stabilizers result in excellent road-surface-following characteristics of the vehicle wheels. In addition, when the vehicle is travelling straight, the pressurized oil is supplied to the power steering apparatus 28 as described previously so that the power steering apparatus 28 is activated.

When the vehicle turns at a small steering angle and at a low vehicle speed, the change-over valve 26 is held in the neutral mode position and the connection-disconnection valve 42 is changed to the disconnection mode position. When the connection-disconnection valve 42 assumes the disconnection mode position, the upper and lower chambers 9e and 9f of each of the cylinder units 9A and 9B are disconnected from each other so that these chambers 9e and 9f are essentially sealed. Sealing of the chambers 9e and 9f essentially fixes the pistons 9b with respect to the cylinders 9a. Specifically, the pistons 9b are fixed in the neutral positions, that is, the positions where the piston displacements S equal zero. Accordingly, in this case, the cylinder units 9A and 9B serve as rigid members connecting the stabilizers and the strut portions 7b, so that the stabilizers are allowed to actually exhibit their intrinsic rigidities and thus to effectively reduce or prevent roll of the vehicle. In other words, the stabilizers are enabled.

When the vehicle turns at a large steering angle or at a high vehicle speed, the change-over valve 26 is changed to the expansion mode position or the contraction mode position and the connection-disconnection valve 42 is changed to the disconnection mode position. In this case, the direction of turn of the vehicle determines whether the change-over valve 26 is changed to the expansion mode position or the contraction mode position. When the change-over valve 26 assumes the expansion mode position, the pressurized oil from the hydraulic pump 22 flows to the lower chambers 9f of the cylinder units 9A and 9B via the line 32, the valve 26, and the lines 35 and 36, and the oil returns from the upper chambers 9e of the cylinder units 9A and 9B to the reservoir 24 via the lines 33 and 34, the valve 26, the line 37, and the power steering apparatus 28. Accordingly, the lower chambers 9f of the cylinder units 9A and 9B are subjected to a high pressure while the upper chambers 9e of the units 9A and 9B are subjected to a low pressure. The resulting pressure differential across the pistons 9b moves the pistons 9b upward and thus expands the cylinder units 9A and 9B. When the control unit 50 detects that the cylinder units 9A and 9B reach target expanded positions by referring to the signal from the position sensor 64, the change-over valve 26 is changed to the neutral mode position so that further expansion of the cylinder units 9A and 9B are prevented. As a result, the cylinder units 9A and 9B are essentially fixed in the target expanded positions. When the cylinder units 9A and 9B expand, the strut portions 7b are moved upward but the opposite strut portions 7a are moved downward by the reaction of the stabilizers. These opposite movements of the strut portions 7a and 7b can offset roll of the vehicle.

Under similar conditions, when the change-over valve 26 assumes the contraction mode position, the pressurized oil from the hydraulic pump 22 flows to the upper chambers 9e of the cylinder units 9A and 9B via the line 32, the valve 26, and the lines 33 and 34, and the oil returns from the lower chambers 9f of the cylinder units 9A and 9B to the reservoir 24 via the lines 35 and 36, the valve 26, the line 37, and the power steering apparatus 28. Accordingly, the upper chambers 9e of the cylinder units 9A and 9B are subjected to a high pressure while the lower chambers 9f of the units 9A and 9B are subjected to a low pressure. The resulting pressure differential across the pistons 9b moves the pistons 9b downward and thus contracts the cylinder units 9A and 9B. When the control unit 50 detects that the cylinder units 9A and 9B reach target contracted positions by referring to the signal from the position sensor 64, the change-over valve 26 is changed to the neutral mode position so that further contraction of the cylinder units 9A and 9B are prevented. As a result, the cylinder units 9A and 9B are essentially fixed in the target contracted positions. When the cylinder units 9A and 9B contract, the strut portions 7b are moved downward but the opposite strut portions 7a are moved upward by the reaction of the stabilizers. These opposite movements of the strut portions 7a and 7b can offset roll of the vehicle.

Figure 4:
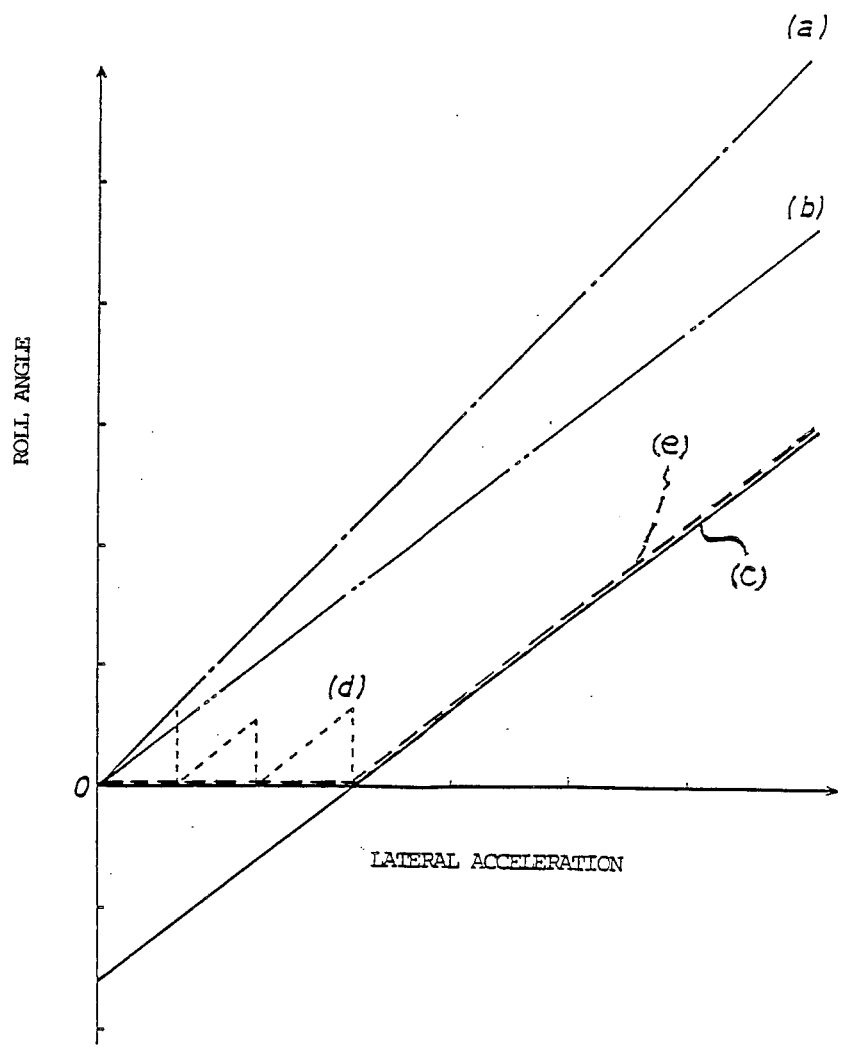
FIG. 4 is a graph showing the relationship between lateral acceleration and roll angle of the vehicle equipped with the stabilizer control system of FIGS. 1 and 3.

FIG. 4 shows the relationship between the lateral acceleration and the roll angle of the vehicle under different conditions of the cylinder units 9A and 9B. In the case where the cylinder units 9A and 9B are free to move, as the lateral acceleration increases from zero, the roll angle increases from zero along the line (a). In the case where the cylinder units 9A and 9B are fixed in the non-diplaced positions, that is, in the neutral positions, as the lateral acceleration increases from zero, the roll angle increases from zero along the line (b) having a smaller inclination than the inclination of the line (a). At the same lateral acceleration, the roll angle on the line (b) is smaller than the roll angle on the line (a). In this way, when the cylinder units 9A and 9B are fixed in the neutral positions, the roll of the vehicle is reduced in comparison with the case where the cylinder units 9A and 9B are free to move. In the case where the cylinder units 9A and 9B are fixed in the fully displaced positions (at which the pistons within the units 9A and 9B are fully displaced from their neutral positions), as the lateral acceleration increases from zero, the roll angle increases from a fixed negative value along the line (c) having essentially the same inclination as the line (b). Specifically, as the lateral acceleration varies between zero and a given value, the roll angle varies between the fixed negative value and zero. In addition, as the lateral acceleration increases from the given value, the roll angle increases from zero. At the same lateral acceleration, the roll angle on the line (c) essentially equals the roll angle on the line (b) minus a fixed positive angle. Accordingly, especially at lateral accelerations greater than the given value, when the cylinder units 9A and 9B are fixed in the fully displaced positions, the roll of the vehicle is more effectively reduced in comparison with the case where the cylinder units 9A and 9B are fixed in the neutral positions. As the piston positions S of the cylinder units 9A and 9B change stepwise from ⅓ to 3/3 through 2/3, the roll angle varies with the lateral acceleration along the sawtooth line (d).

It should be noted that the fixed positions of the cylinder units 9A and 9B may be continuously varied between the neutral positions and the fully displaced positions in accordance with the vehicle steering conditions and the vehicle speed. In this case, the roll angle of the vehicle varies with the lateral acceleration of the vehicle along the line (e) of FIG. 4. As shown in FIG. 4, the continuous fixed position control of the cylinder units 9A and 9B keeps the roll angle of the vehicle at essentially zero in the range where the lateral acceleration varies between zero and a given value. In addition, at the lateral accelerations above the given value, the cylinder units 9A and 9B are fixed in the fully displaced positions so that the roll angle of the vehicle increases in a manner similar to the case represented by the line (c).

Figure 5:
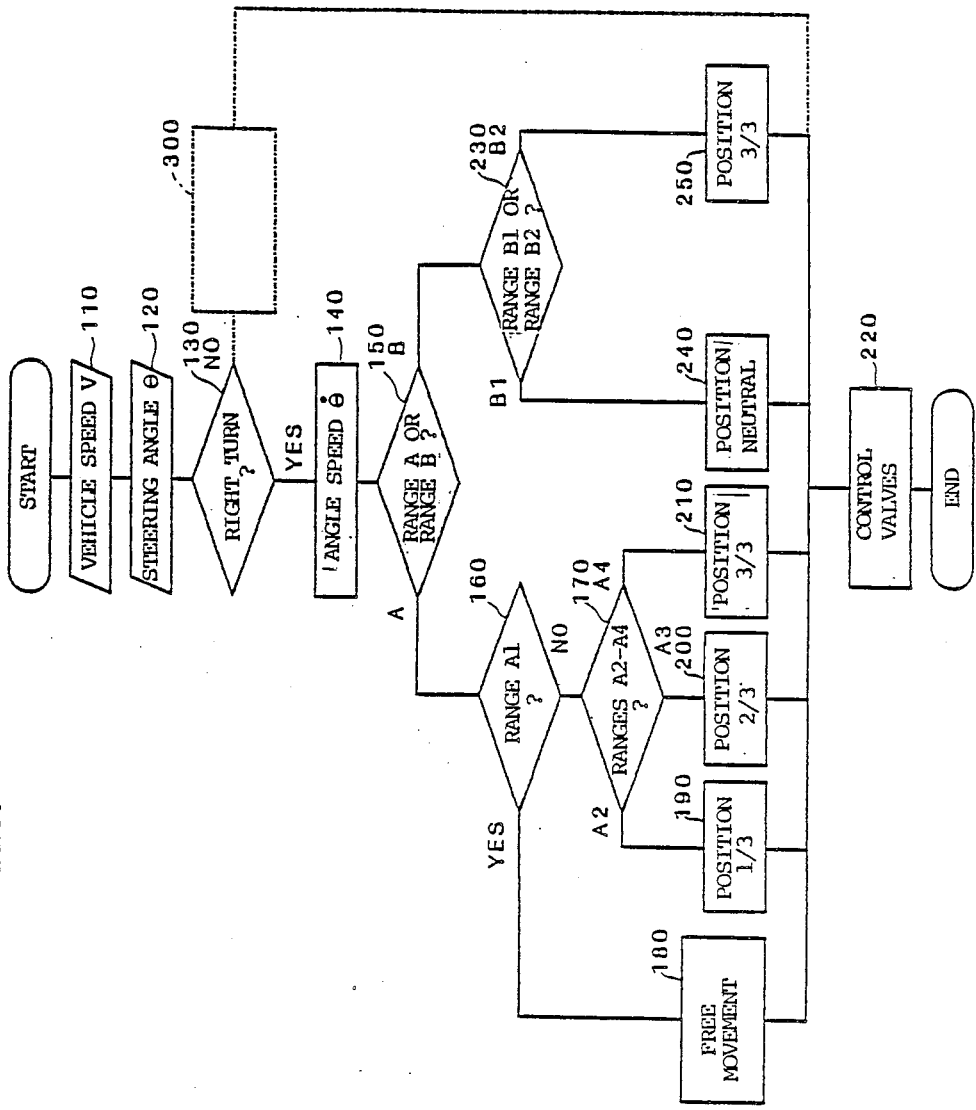
FIG. 5 is a flowchart of a program operating the electronic control unit of FIG. 3.

The control unit 50 operates in accordance with a program stored in the ROM 53. FIG. 5 is a flowchart of this program. The program reiterates periodically.

As shown in FIG. 5, a first step 110 of the program reads the current vehicle speed V derived from the signal outputted by the vehicle speed sensor 60.

A step 120 following the step 110 reads the current steering angle $\theta$ derived from the signal outputted by the steering sensor 62.

A step 130 following the step 120 determines whether or not the vehicle is turning right, that is, turning clockwise, on the basis of the steering angle $\theta$ read in the preceding step 120. When the vehicle is turning right, the program advances to a step 140. When the vehicle is not turning right, the program advances to a block 300.

The step 140 calculates the current speed or rate $\dot\theta$ of a variation in the steering angle. Specifically, the step 140 first calculates the difference between the steering angle derived in the current execution cycle of the program and the steering angle derived in the preceding execution cycle of the program. Second, the step 140 calculates the steering angle variation speed $\dot\theta$ from the steering angle difference and the time interval between the current execution cycle of the program and the preceding execution cycle of the program.

Figure 6:
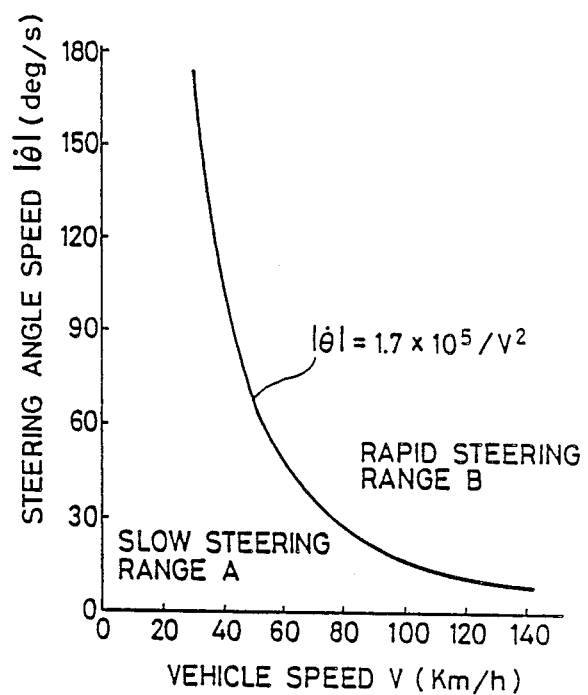
FIG. 6 is a graph showing vehicle operating condition ranges divided in accordance with steering angle variation speed and vehicle speed.

A step 150 following the step 140 determines whether the vehicle speed V and the steering angle variation speed $\dot\theta$ reside in a preset steering slow-change range A or in a preset steering rapid-change range B by referring to a map shown in FIG. 6. It should be noted that this map is stored in the ROM 53. When the values V and $\dot\theta$ reside in the slow range A, the program advances to a step 160. When the values V and $\dot\theta$ reside in the rapid range B, the program advances to a step 230.

Figure 7:
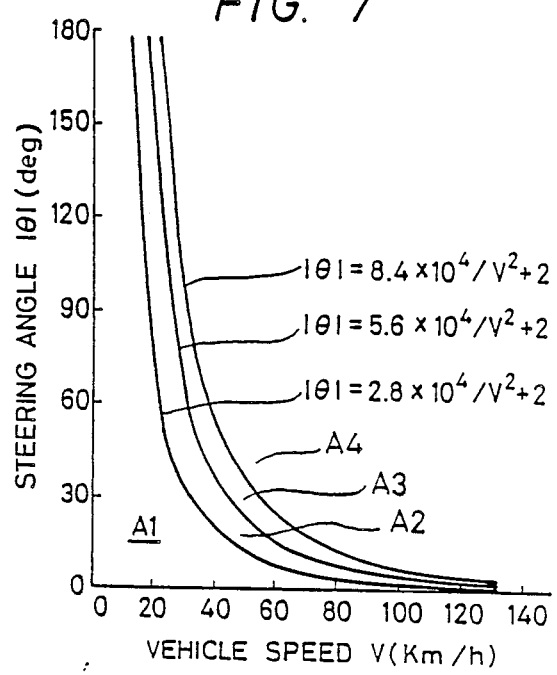
FIG. 7 is a graph showing vehicle operating condition ranges divided in accordance with steering angle and vehicle speed.
Figure 8:
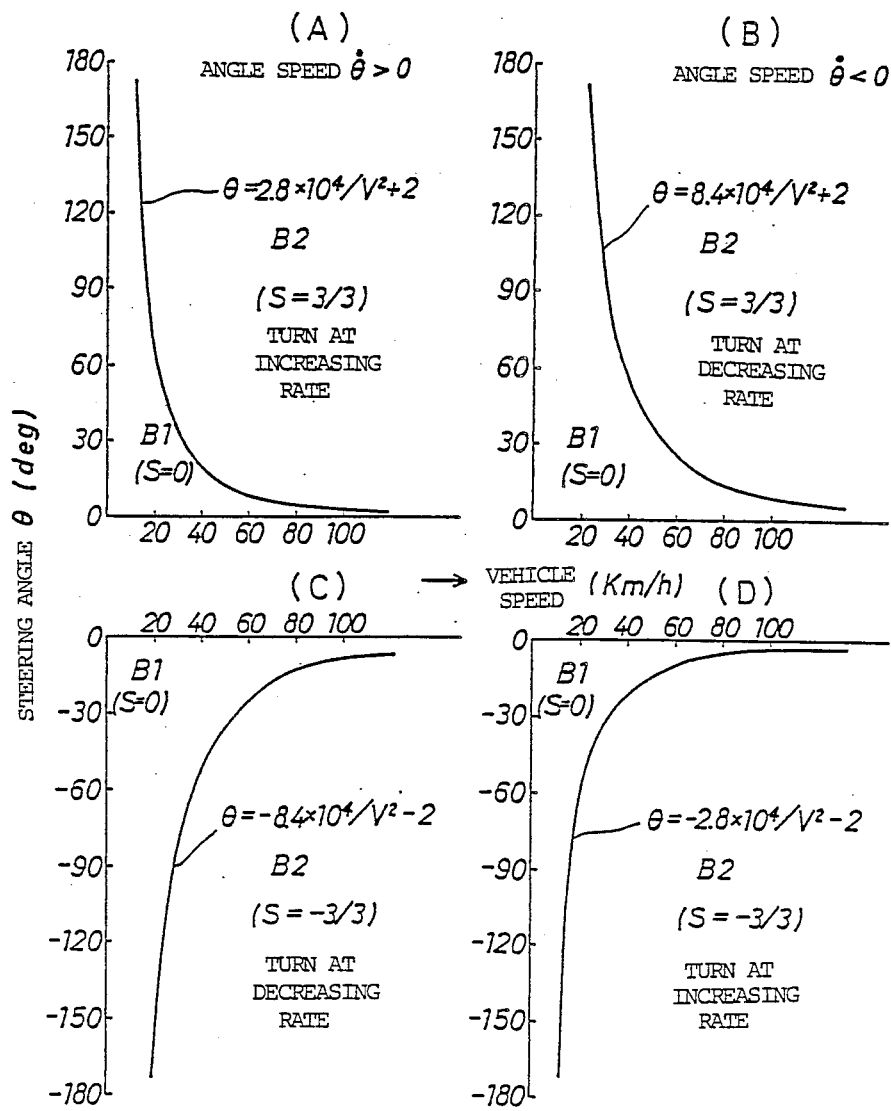
FIG. 8 is a graph showing vehicle operating condition ranges divided in accordance with steering angle and vehicle speed.

The step 160 determines whether or not the vehicle speed V and the steering angle $\dot\theta$ reside in a preset slow sub-range A1 by referring to a map shown in FIG. 7. It should be noted that this map is stored in the ROM 53. When the values V and $\dot\theta$ reside in the slow sub-range A1, the program advances to a step 180. When the values V and $\dot\theta$ reside outside the slow sub-range A1, the program advances to a step 170.

The step 170 determines which sub-range the vehicle speed V and the steering angle $\dot\theta$ reside by referring to the map of FIG. 7. When the values V and $\dot\theta$ reside in a preset slow sub-range A2, the program advances to a step 190. When the values V and $\dot\theta$ reside in a preset slow sub-range A3, the program advances to a step 200.

When the values V and $\dot\theta$ reside in a preset slow sub-range A4, the program advances to a step 210.

Degrees of steering change corresponding to the sub-range A2 are greater than degrees of steering change corresponding to the sub-range A1. Degrees of steering change corresponding to the sub-range A3 are greater than degrees of steering change corresponding to the sub-range A2. Degrees of steering change corresponding to the sub-range A4 are greater than degrees of steering change corresponding to the sub-range A3.

The step 180 sets desired mode positions of the change-over valve 26 and the connection-disconnection valve 42 which allow the cylinder units 9A and 9B to be free to move. After the step 180, the program advances to a step 220.

The step 190 sets target positions or displacements S of the pistons 9b of the cylinder units 9A and 9B to ⅓. Second, the step 190 reads the actual position of the piston 9b of the cylinder unit 9A derived from the signal outputted by the position sensor 64. Then, the step 190 sets desired mode positions of the change-over valve 26 and the connection-disconnection valve 42 in accordance with the difference between the target and actual positions of the piston 9b. These desired mode positions of the solenoid valves 26 and 42 are chosen to allow the pistons 9b to move toward or remain at the target positions. Specifically, when the actual position of the piston 9b is lower than the target position of the piston 9b, desired mode positions of the solenoid valves 26 and 42 are set to allow the cylinder units 9A and 9B to expand. When the actual position of the piston 9b is higher than the target position of the piston 9b, desired mode positions of the solenoid valves 26 and 42 are set to allow the cylinder units 9A and 9B to contract. When the actual position of the piston 9b equals the target position of the piston 9b, desired mode positions of the solenoid valves 26 and 42 are set to allow the cylinder units 9A and 9B to be fixed. After the step 190, the program advances to the step 220.

The step 200 sets target positions or displacements S of the pistons 9b of the cylinder units 9A and 9B to ⅔. Second, the step 200 reads the actual position of the piston 9b of the cylinder unit 9A derived from the signal outputted by the position sensor 64. Then, the step 200 sets desired mode positions of the change-over valve 26 and the connection-disconnection valve 42 in accordance with the difference between the target and actual positions of the piston 9b. These desired mode positions of the solenoid valves 26 and 42 are chosen to allow the pistons 9b to move toward or remain at the target positions as in the step 190. After the step 200, the program advances to the step 220.

The step 210 sets target positions or displacements S of the pistons 9b of the cylinder units 9A and 9B to 3/3 (fully displaced positions). Second, the step 210 reads the actual position of the piston 9b of the cylinder unit 9A derived from the signal outputted by the position sensor 64. Then, the step 210 sets desired mode positions of the change-over valve 26 and the connection-disconnection valve 42 in accordance with the difference between the target and actual positions of the piston 9b. These desired mode positions of the solenoid valves 26 and 42 are chosen to allow the pistons 9b to move toward or remain at the target positions as in the step 190. After the step 210, the program advances to the step 220.

The step 220 controls the change-over valve 26 and the connection-disconnection valve 42 in accordance with the desired mode positions of the solenoid valves 26 and 42 set in the preceding steps 180, 190, 200, and 210. Specifically, the control signals outputted to the solenoid valves 26 and 42 are adjusted so that the actual mode position of the solenoid valves 26 and 42 will equal the desired mode positions of the solenoid valves 26 and 42. After the step 220, the current execution cycle of the program ends.

The step 230 determines whether the vehicle speed V and the steering angle $\theta$ reside in a preset rapid sub-range B1 or in a preset rapid sub-range B2 by referring to maps shown in FIGS. 8(A)-8(D). It should be noted that these maps are stored in the ROM 53. When the values V and $\theta$ reside in the sub-range B1, the program advances to a step 240. When the values V and $\theta$ reside in the sub-range B2, the program advances to a step 250.

The reference maps used in the step 230 are changed in accordance with the steering angle $\theta$ and the steering angle variation speed $\dot\theta$. Specifically, when both the steering angle $\theta$ and the steering angle variation speed $\dot\theta$ are positive, that is, when the vehicle is subjected to a right or clockwise turn at an increasing rate, the map of FIG. 8(A) is used. When the steering angle $\theta$ is positive and the steering angle variation speed $\dot\theta$ is negative, that is, when the vehicle is subjected to a right or clockwise turn at a decreasing rate, the map of FIG. 8(B) is used. When the steering angle $\theta$ is negative and the steering angle variation speed $\dot\theta$ is positive, that is, when the vehicle is subjected to a left or counterclockwise turn at a decreasing rate, the map of FIG. 8(C) is used. When both the steering angle $\theta$ and the steering angle variation speed $\dot\theta$ are negative, that is, when the vehicle is subjected to a left or counterclockwise turn at an increasing rate, the map of FIG. 8(D) is used.

The step 240 sets target positions or displacements S of the pistons 9b of the cylinder units 9A and 9B to zero (neutral position). Second, the step 240 reads the actual position of the piston 9b of the cylinder unit 9A derived from the signal outputted by the position sensor 64. Then, the step 240 sets desired mode positions of the change-over valve 26 and the connection-disconnection valve 42 in accordance with the difference between the target and actual positions of the piston 9b. These desired mode positions of the solenoid valves 26 and 42 are chosen to allow the pistons 9b to move toward or remain at the target positions as in the step 190. After the step 240, the program advances to the step 220.

The step 250 sets target positions or displacements S of the pistons 9b of the cylinder units 9A and 9B to 3/3 or −3/3 (fully displaced positions). Specifically, in the case of a right or clockwise turn of the vehicle, the target positions of the pistons 9b are set to 3/3. In the case of a left or counterclockwise turn of the vehicle, the target positions of the pistons 9b are set to −3/3. Second, the step 250 reads the actual position of the piston 9b of the cylinder unit 9A derived from the signal outputted by the position sensor 64. Then, the step 250 sets desired mode positions of the solenoid valves 26 and 42 in accordance with the difference between the target and actual positions of the piston 9b. These desired mode positions of the solenoid valves 26 and 42 are chosen to allow the pistons 9b to move toward or remain at the target positions as in the step 190. After the step 250, the program advances to the step 220.

The step 220 controls the change-over valve 26 and the connection-disconnection valve 42 in accordance with the desired mode positions of the solenoid valves 26 and 42 set in the preceding steps 240 and 250. Specifically, the control signals outputted to the solenoid valves 26 and 42 are adjusted so that the actual mode positions of the solenoid valves 26 and 42 will equal the desired mode positions of the solenoid valves 26 and 42. After the step 220, the current execution cycle of the program ends.

As described previously, when the vehicle is not turning right, the program moves from the step 130 to the block 300. The block 300 includes steps to determine desired mode positions of the change-over valve 26 and the connection-disconnection valve 42 during a left or counterclockwise turn of the vehicle. These steps within the block 300 are designed and connected in a manner similar to the steps 140–250 related to a right or clockwise turn of the vehicle except for the following design change. Target positions of the pistons 9b of the cylinder units 9A and 9B set in the steps of the block 300 have the reverse or inverse relation with the target positions set in the steps 190–250. After the block 300, the program advances to the step 220 which controls the solenoid valves 26 and 42 in accordance with the desired mode positions of the solenoid valves 26 and 42 set in the block 300.

The control process defined by the program of FIG. 5 changes the cylinder units 9A and 9B between freely-movable states and fixed states in accordance with the steering angle $\theta$, the steering angle variation speed $\dot\theta$, and the vehicle speed V. Furthermore, the fixed positions of the cylinder units 9A and 9B are varied stepwise in accordance with the steering angle $\theta$, the steering angle variation speed $\dot\theta$, and the vehicle speed V. Specifically, in the steering slow-change range A where the steering angle variation speed $\dot\theta$ is generally small, the fixed positions of the cylinder units 9A and 9b are changed finely to optimize the effective torsional rigidity of the stabilizers. In the steering rapid-change range B where the steering angle variation speed $\dot\theta$ is generally high, the fixed positions of the cylinder units 9A and 9b are changed by large positional intervals to increase the stabilizer control speed and thereby allow the stabilizer control to quickly follow the steering angle variation speed or the turn speed of the vehicle. Accordingly, the torsional rigidity of the stabilizers are optimally controlled in accordance with the steering angle, the steering angle variation speed, and the vehicle speed so that the road-surface-following characteristic of the vehicle wheels and the rolling characteristic of the vehicle are acceptably adjusted in dependence on the operating conditions of the vehicle.

Figure 9:
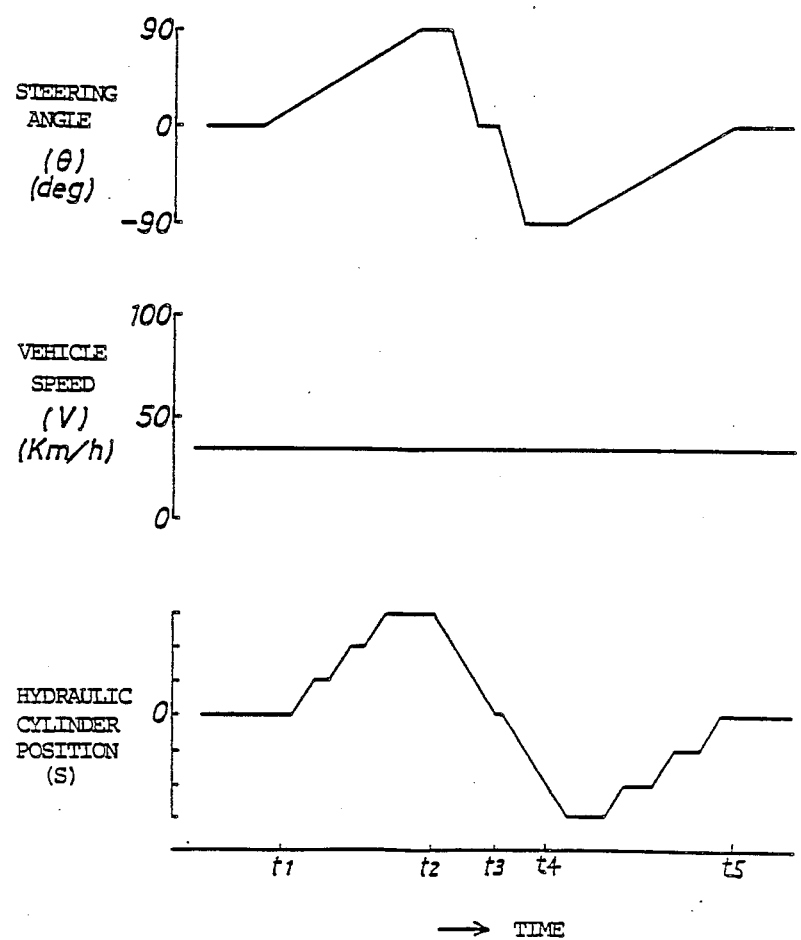
FIG. 9 is a timing diagram of steering angle, vehicle speed, and position of the hydraulic cylinder unit in the stabilizer control system of FIGS. 1 and 3.
Figure 10:
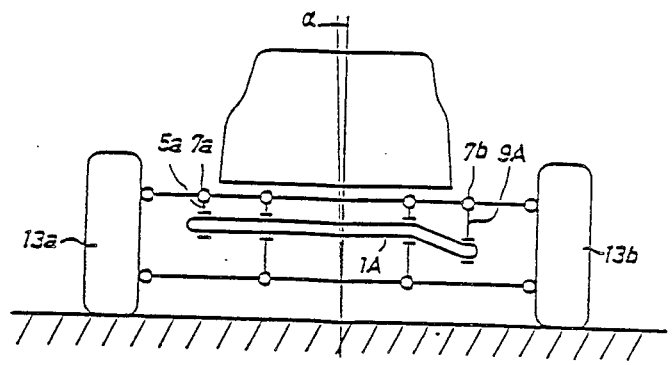
FIGS. 10 and 11 are diagrams of the vehicle equipped with the stabilizer control system of FIGS. 1 and 3 under different operating conditions.
Figure 11:
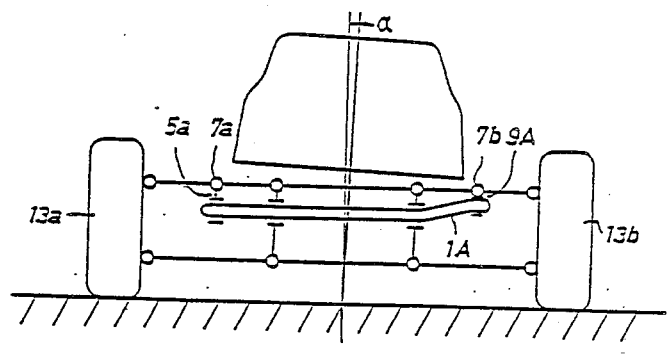

FIG. 9 shows the relationship between the travelling conditions of the automotive vehicle equipped with the stabilizer control system of this embodiment and the positions of the cylinder units in the stabilizer control system. As shown in FIG. 9, under conditions where the vehicle speed remains 40 km/h, until a moment t1, the steering angle is held 0° and thus the vehicle travels straight. In this case, the cylinder nits 9A and 9B are allowed to move freely so that the piston displacements of the cylinder units 9A and 9B usually remain or move around 0 (neutral). At the moment t1, the steering angle starts to be increased from 0° in the direction of a right or clockwise turn of the vehicle. During the interval between the moment t1 and a moment t2, the steering angle virtually continues to be increased at a small rate in the direction of the right turn of the vehicle. Near the moment t2, the steering angle reaches 90°. During the interval between the moments t1 and t2, the piston displacements of the cylinder units 9A and 9B are increased stepwise from 0 to 3/3 (fully displaced position) by way of ⅓ and ⅔ in accordance with the increase in the steering angle. In this case, as shown in FIG. 10, the expanded cylinder unit 9A reduces the roll angle α of the vehicle. At the moment t2, the steering angle starts to be returned and decreased. During the interval between the moment t2 and a moment t3, the steering angle virtually continues to be decreased at a large rate. Near the moment t3, the steering angle returns to 0°. During the interval between the moments t2 and t3, the piston displacements of the cylinder units 9A and 9B are changed from 3/3 to 0. At the moment t3, the steering angle starts to be decreased from 0° in the direction of a left or counterclockwise turn of the vehicle. During the interval between the moment t3 and a moment t4, the steering angle virtually continues to be decreased at a large rate in the direction of the left turn of the vehicle. Near the moment t4, the steering angle reaches −90°. During the interval between the moments t3 and t4, the piston displacements of the cylinder units 9A and 9B are changed from 0 to −3/3 (fully displaced position). At the moment t4, the steering angle starts to be returned and increased from −90°. During the interval between the moment t4 and a moment t5, the steering angle virtually continues to be increased at a small rate. At the moment t5, the steering angle reaches 0°. During the interval between the moments t4 and t5, the piston displacements of the cylinder units 9A and 9B are decreased stepwise from −3/3 to 0 (neutral) by way of −⅔ and −⅓ in accordance with the decrease in the steering angle. In this case, as shown in FIG. 11, the contracted cylinder unit 9A reduces the roll angle α of the vehicle.

Figure 12:
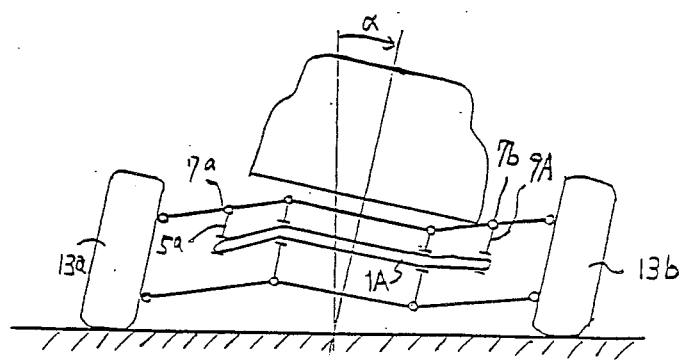
FIG. 12 is a diagram of a vehicle under assumed conditions.

It is assumed that the cylinder units 9A and 9B are fixed in their neutral positions during a left turn of the vehicle. In this assumed case, the roll angle α of the vehicle would be large as shown in FIG. 12. As described previously, in this embodiment, the cylinder units 9A and 9B are fixed in their contracted positions during such a left turn of the vehicle. These contracted cylinder units 9A and 9B reduce the roll angle α of the vehicle, as shown in FIG. 11, in comparison with the above-mentioned assumed case of FIG. 12. In more detail, in FIG. 1, as the cylinder unit 9A contracts, the strut portion 7b is moved downward and the opposite strut portion 7a is moved upward by the reaction of the stabilizer 1A. The downward movement of the strut portion 7b and the upward movement of the strut portion 7a allow the front suspensions to essentially maintain their normal configurations, so that the vehicle body is prevented from rolling and is held in essentially a normal position with respect to the road surface during a turn of the vehicle.

During a turn, the automotive vehicle is subjected to a centrifugal force which can cause roll of the vehicle. It is preferable that the stabilizer or stabilizers are twisted via the cylinder units 9A and 9B in accordance with the centrifugal force. It should be noted that the centrifugal force can be estimated from the steering angle and the vehicle speed. The control of the stabilizers dependent on the centrifugal force allows the vehicle to be essentially free from roll and thus allows the vehicle to assume an acceptably level attitude or posture during a turn of the vehicle.

DESCRIPTION OF THE SECOND PREFERRED EMBODIMENT

Figure 13:
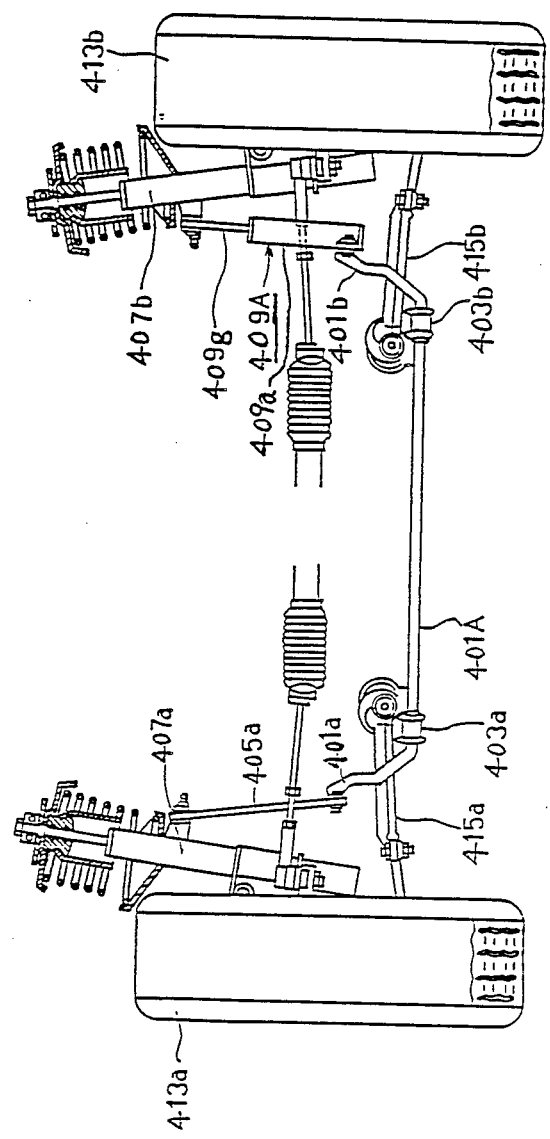
FIG. 13 is a diagram of a front portion of a vehicle equipped with a stabilizer control system according to a second embodiment of this invention.

With reference to FIG. 13, an automotive vehicle has a front U-shaped sway bar or stabilizer 401A rotatably supported on a vehicle body by rubber bearings 403a and 403b. The stabilizer 401A includes opposite ends 401a and 401b, and an elastically deformable or twistable torsion segment extending between the ends 401a and 401b. The ends 401a and 401b serve to transmit a torsional force to and from the torsion segment. One end 401a of the stabilizer 401A is connected to a spring lower member, such as a strut portion 407a of a shock absorber, via a tie rod 405a. The end 401a of the stabilizer 401A may be connected to a suspension arm. The other end 401b of the stabilizer 401A is connected to a spring lower member, such as a strut portion 407b of a shock absorber, via a hydraulic cylinder unit 409A. The end 401b of the stabilizer 401A may be connected to a suspension arm via the cylinder unit 409A. A front vehicle wheel 413a is connected to the vehicle body via a lower arm 415a and the strut portion 407a. An opposite front vehicle wheel 413b is connected to the vehicle body via a lower arm 415b and the strut portion 407b.

The hydraulic cylinder unit 409A is of the single rod type, having a hollow cylinder 409a and a movable piston rod 409g extending coaxially through only an upper end of the cylinder 409a. As the piston rod 409g moves through its entire stroke, the piston rod 409g does not emerge out of a lower end of the cylinder 409a. This single-rod-type hydraulic cylinder unit 409A occupies or needs a smaller space than a double-rod-type hydraulic cylinder unit having a piston rod projecting outward from opposite ends of a cylinder.

Figure 14:
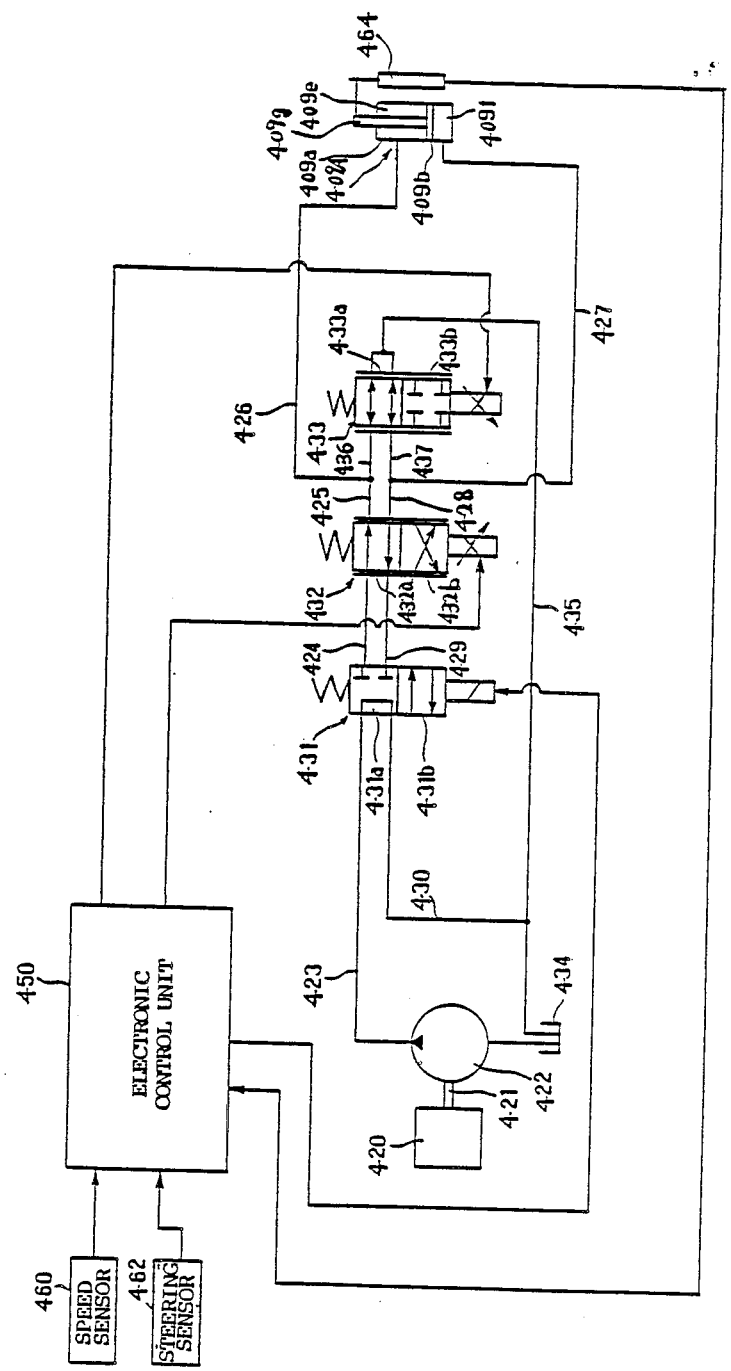
FIG. 14 is a schematic diagram of the stabilizer control system of the second embodiment of this invention.

As shown in FIG. 14, the cylinder unit 409A includes a slidable piston 409b disposed within the cylinder 409a. The interior of the cylinder 409a is divided by the piston 409b into an upper chamber 409e and a lower chamber 409f. The piston 409b moves relative to the cylinder 409a in accordance with the difference in pressure between the upper and lower chambers 409e and 409f. A lower end of the rod 409g is fixed to the piston 409b so that the rod 409g moves together with the piston 409b. An upper or free end of the piston rod 409g is connected to the strut portion 407b (see FIG. 13). The cylinder 409a is connected to the end 401b of the stabilizer 401A (see FIG. 13). As the piston rod 409g moves upward relative to the cylinder 409a, the effective length of the cylinder unit 409A increases and also the effective distance between the stabilizer end 401b and the strut portion 407b increases. As the piston rod 409g moves downward relative to the cylinder 409a, the effective length of the cylinder unit 409A decreases and also the effective distance between the stabilizer end 401b and the strut portion 407b decreases. Since the stabilizer 401A is twisted in accordance with the effective distance between the stabilizer end 401b and the strut portion 407b, the torsional rigidity of the stabilizer 401A depends on the effective length of the cylinder unit 409A. As will be made clear hereinafter, the cylinder unit 409A is controlled to adjust the characteristic of the torsional rigidity of the stabilizer 401A. In addition, the cylinder unit 409A serves to selectively enable and disable the stabilizer 401A.

It should be noted that the piston rod 409g may be connected to the stabilizer end 401b. In this case, the cylinder 409a is connected to the strut portion 407b.

As shown in FIG. 14, an automotive engine 420 has a crankshaft or output shaft 421 connected to a hydraulic pump 422. The engine 420 powers the hydraulic pump 422. It should be noted that the engine output shaft 421 is also connected to the vehicle driving wheels to allow the engine 420 to power the driving wheels. The inlet of the hydraulic pump 422 is connected to an oil reservoir 434. The hydraulic pump 422 draws hydraulic fluid or oil from the reservoir 434 and discharges the pressurized hydraulic fluid or oil. The hydraulic pump 422 includes a flow adjustment valve which regulates the discharge rate of the pressurized oil at a constant level independent of the rotational speed of the engine 420. The outlet of the hydraulic pump 422 is connected to an unloading solenoid valve 431 via a hydraulic line 423. The unloading valve 431 is connected to the reservoir 434 via a hydraulic line 430. The unloading valve 431 is connected to a change-over solenoid valve 432 via hydraulic lines 424 and 429. The change-over valve 432 is connected to the upper and lower chambers 409e and 409f of the cylinder unit 409A via hydraulic lines 425–428. The change-over valve 432 is also connected to a flow adjustment solenoid valve 433 via the hydraulic lines 425 and 428, and via hydraulic lines 436 and 437. The flow adjustment valve 433 is connected to the reservoir 434 via a hydraulic line 435. The pressurized oil from the hydraulic pump 422 is controllably supplied to the upper and lower chambers 409e and 409f of the cylinder unit 409A via the lines 423–430, the unloading valve 431, the change-over valve 432, and the flow adjustment valve 433.

The unloading valve 431 is changeable between a first position 431a and a second position 431b. When the unloading valve 431 assumes the first position 431a, the valve 431 connects the lines 423 and 430 and blocks the lines 424 and 429, returning the pressurized oil from the hydraulic pump 422 to the reservoir 434 and interrupting subsequent supply of the pressurized oil to the cylinder unit 409A. When the unloading valve 431 assumes the second position 431b, the valve 431 connects the lines 423 and 424 and also connects the lines 429 and 430 so that the pressurized oil from the hydraulic pump 422 can travel to the cylinder unit 409A. The unloading solenoid valve 431 is electrically connected to an electronic control unit 450. The position change of the unloading valve 431 is performed via an electrical signal outputted from the control unit 450 to the valve 431.

The change-over valve 432 is changeable between a first position 432a and a second position 432b. When the change-over valve 432 assumes the first position 432a, the valve 432 connects the line 424 to the upper lines 425 and 426 and also connects the line 429 to the lower lines 427 and 428. In this case, provided that the unloading valve 431 is in the second position 431b, the pressurized oil can travel to the upper chamber 409e of the cylinder unit 409A and the oil can escape from the lower chamber 409f of the cylinder unit 409A toward the reservoir 434 so that the piston rod 409g of the cylinder unit 409A can be moved downward and the cylinder unit 409A can be contracted. When the change-over valve 432 assumes the second position 432b, the valve 432 connects the line 424 to the lower lines 427 and 428 and also connects the line 429 to the upper lines 425 and 426. In this case, provided that the unloading valve 431 is in the second position 431b, the pressurized oil can travel to the lower chamber 409f of the cylinder unit 409A and the oil can escape from the upper chamber 409e of the cylinder unit 409A toward the reservoir 434 so that the piston rod 409g of the cylinder unit 409A can be moved upward and the cylinder unit 409A can be expanded. The change-over solenoid valve 432 is electrically connected to the control unit 450. The change-over valve 432 is continuously moved between the first and second positions via an electric control signal outputted from the control unit 450 to the valve 432.

The control signal to the change-over valve 432 may be in the form of a pulse train having a fixed high frequency and a variable duty cycle. In this case, the change-over valve 432 is in one of the first and second positions 432a and 432b during the presence of a pulse and is in the other position during the absence of a pulse. Furthermore, the change-over valve 432 switches between the first and second positions 432a and 432b at the high frequency. This high-frequency and variable-duty-cycle pulse drive allows an essentially continuous change of the valve 432 between the first and second positions 432a and 432b. Specifically, the change-over valve 432 is continuously changed between the first and second positions 432a and 432b in accordance with the duty cycle of the control signal. This continuous position change of the valve 432 can prevent an abrupt variation of the hydraulic pressure which might cause vibration and noise.

The flow adjustment valve 433 serves to continuously control the rate of hydraulic fluid flow. The flow adjustment valve 433 is connected between the line 426 and the line 427 leading to the upper chamber 409e and the lower chamber 409f of the hydraulic cylinder unit 409A respectively. The flow adjustment valve 433 is also connected to the line 435 leading to the reservoir 434. The flow adjustment valve 433 serves to control the communication between the upper and lower chambers 409e and 409f of the cylinder unit 409A and also to control the connection of the chambers 409e and 409f to the reservoir 434. Specifically, the flow adjustment valve 433 is changeable between a first position 433a and a second position 433b. When the flow adjustment valve 433 assumes the first position 433a, the upper and lower chambers 409e and 409f of the cylinder unit 409A, and the reservoir 434 are moved into communication with each other via the lines 426, 427, and 435, and via the valve 433. In this case, the piston 409b of the cylinder unit 409A is essentially free to move. When the flow adjustment valve 433 assumes the second position 433b, the upper and lower chambers 409e and 409f, and the reservoir 434 are disconnected from each other. In this case, the piston 409b of the cylinder unit 409A can be essentially fixed. The flow adjustment solenid valve 433 is electrically connected to the control unit 450. The flow adjustment valve 433 is continuously moved between the first and second positions 433a and 433b via an electric control signal outputted from the control unit 450 to the valve 433.

The control signal to the flow adjustment valve 433 may be in the form of a pulse train having a fixed high frequency and a variable duty cycle. In this case, the flow adjustment valve 433 is in one of the first and second positions 433a and 433b during the presence of a pulse and is in the other position during the absence of a pulse. Furthermore, the flow adjustment valve 433 switches between the first and second positions 433a and 433b at the high frequency. This high-frequency and variable-duty-cycle pulse drive allows an essentially continuous change of the valve 433 between the first and second positions 433a and 433b. Specifically, the flow adjustment valve 433 is continuously changed between the first and second positions 433a and 433b in accordance with the duty cycle of the control signal. This continuous position change of the valve 433 can prevent an abrupt variation of the hydraulic pressure which might cause vibration and noise.

A speed sensor 460 generates a signal representative of the speed of the vehicle which is outputted to the control unit 450 via an electrical connection between the elements 450 and 460. A steering sensor 462 generates a signal representing the vehicle steering angle, that is, the operated angle or angular position of a vehicle steering wheel. This steering angle signal is transmitted to the control unit 450 via an electrical connection between the elements 450 and 462. It should be noted that the steering angle signal represents the value of steering displacement and also the direction of steering motion. A position sensor 464 connected to the cylinder unit 409A generates a signal representing the position of the piston 409b of the unit 409A relative to the cylinder 409a of the unit 409A. The position sensor 464 may include a potentiometer having a control arm which moves in accordance with the displacement of the piston 409b relative to the cylinder 409a. The piston position signal is transmitted to the control unit 450 via an electrical connection between the elements 450 and 464.

The control unit 450 adjusts the control signals to the unloading valve 431, the change-over valve 432, and the flow adjustment valve 433 in accordance with the signals from the sensors 460, 462, and 464 by referring to a preset program. As will be described hereinafter, the control unit 450 determines a target piston displacement of the cylinder unit 409A in accordance with operating conditions of the vehicle derived from the signals outputted by the vehicle speed sensor 460 and the steering sensor 462. Furthermore, while monitoring the actual piston displacement of the cylinder unit 409A derived from the signal outputted by the position sensor 464, the control unit 450 adjusts the cylinder unit 409A via the unloading valve 431, the change-over valve 432, and the flow adjustment valve 433 so that the actual piston displacement of the cylinder unit 409A will move toward or remain at the target piston displacement of the cylinder unit 409A. The target piston displacement of the cylinder unit 409A is chosen to reduce or prevent roll or transverse inclination of the vehicle during a turn of the vehicle.

In operation, when the vehicle is travelling straight, the control unit 450 continuously de-energizes the unloading valve 431, the change-over valve 432, and the flow adjustment valve 433 so that the valves 431, 432, and 433 remain in the positions 431a, 432a, and 433a respectively as shown in FIG. 14. Accordingly, the pressurized oil from the hydraulic pump 422 returns to the reservoir 434 via the unloading valve 431a and is not supplied to the cylinder unit 409A. In addition, the upper and lower chambers 409e and 409f of the cylinder unit 409A continuously communicate with each other and also communicate with the reservoir 434 via the flow adjustment valve 433, so that the piston 409b of the cylinder unit 409A is free to move relative to the cylinder 409a of the unit 409A. When the piston 409b is free to move relative to the cylinder 409a, the stabilizer end 401b and the strut portion 407b are essentially disconnected or separated from each other, disabling the stabilizer 401 and thereby allowing independent vertical movements of the left-hand and right-hand strut portions 407a and 407b or independent vertical movements of the left-hand and right-hand vehicle wheel suspensions. In this way, when the vehicle is travelling straight, the stabilizer 401 is disabled. During a straight travel of the vehicle along a rough road, the disablement of the stabilizer 401 can maintain an acceptable road-surface-following characteristic of the vehicle wheels.

When the vehicle turns, the control unit 450 adjusts the position of the change-over valve 432 in accordance with the direction of the vehicle turn and energizes the unloading valve 431. This energization changes the unloading valve 431 to the second position 431b so that the pressurized oil from the hydraulic pump moves toward the cylinder unit 409A through the valve 431. At the same time, the control unit 450 gradually changes the flow adjustment valve 433 from the first position 433a to the second position 433b. Accordingly, the pressurized oil from the hydraulic pump 422 moves into the cylinder unit 409A through the unloading valve 431 and the change-over valve 432, and then the oil returns from the cylinder unit 409A to the reservoir 434 via the valves 431 and 432. The supply of the pressurized oil to the cylinder unit 409A displaces the piston 409b relative to the cylinder 409a of the unit 409A.

The gradual position change of the flow adjustment valve 433 from the first position 433a to the second position 433b allows the rate of the pressurized oil supply to the cylinder unit 409A o increase gradually and also allows the cylinder unit 409A to be gradually disconnected from the reservoir 434. This gradual control of the flow paths of the hydraulic fluid prevents an abrupt movement of the piston 409b of the cylinder unit 409A which might cause a shock on the vehicle or noise. The output power or load of the cylinder unit 409A and also the speed of the piston 409b of the cylinder unit 409A are adjusted via continuous position control of the flow adjustment valve 433. Specifically, when the flow adjustment valve 433 assumes the second position 433b, both the output power of the cylinder unit 409A and the speed of the piston 409b are maximized. As the flow adjustment valve 433 moves toward the first position 433a, both the output power of the cylinder unit 409A and the speed of the piston 409b decrease.

During the turn of the vehicle, the control unit 450 determines a target position of the piston 409b relative to the cylinder 409a of the hydraulic unit 409A. When the actual position of the piston 409b relative to the cylinder 409a detected via the position sensor 464 reaches the target position, the control unit 450 changes the unloading valve 431 to the position 431a and also changes the flow adjustment valve 433 to the position 433b, so that the supply of the pressurized oil to the cylinder unit 409A is interrupted and also the upper chamber 409e and the lower chamber 409b are independently sealed. Accordingly, when the actual position of the piston 409b reaches the target position, the piston 409b is stopped. Then, the piston 409b is essentially fixed in the target position. The fixed piston 409b connects the stabilizer end 401b to the strut portion 407b and thereby enables the stabilizer 401A. In this way, during the turn of the vehicle, the stabilizer 401A is enabled so that roll of the vehicle is reduced or prevented.

The control unit 450 varies the target position of the piston 409b of the cylinder unit 409A in accordance with operating conditions of the vehicle derived from the signals outputted by the vehicle speed sensor 460 and the steering sensor 462 Accordingly, the fixed position of the piston 409b depends on the vehicle operating conditions. As is understood from the previous description, the anti-rolling characteristic of the stabilizer 401A varies with the fixed position of the piston 409b, so that the anti-rolling characteristic of the stabilizer 401A depends on the vehicle operating conditions. In the case of a vehicle which does not have the stabilizer control system of this invention, the degree of rolling of the vehicle depends on vehicle operating conditions, such as vehicle steering conditions and vehicle speed. In this invention, the dependency of the anti-rolling characteristic of the stabilizer 401A on the vehicle operating conditions is chosen to maintain the degree of generated rolling of the vehicle in an acceptable range regardless of the vehicle operating conditions. Accordingly, during turns of the vehicle at varying degrees and at varying vehicle speeds, the vehicle is held in an essentially level or small inclined state It is preferable that the change of the valve 432 between the positions 432a and 432b is performed continuously, since a continuous position change of the valve 432 prevents an abrupt variation of the hydraulic pressure applied to the cylinder unit 409A. It should be noted that an abrupt variation of the hydraulic pressure applied to the cylinder unit 409A results in an abrupt movement of the piston 409b of the unit 409A which might cause a shock on the vehicle or noise.

When the turn of the vehicle ends, the control unit 450 gradually changes the flow adjustment valve 433 from the second position 433b to the first position 433a so that the upper and lower chambers 409e and 409f of the cylinder unit 409A, and the reservoir 434 are gradually connected to each other. As a result, the piston 409b of the cylinder unit 409A is allowed to move freely relative to the cylinder 409a of the unit 409A. The piston 409b finally moves to a position determined by the original or normal rigidity of the stabilizer 401A. The speed of the piston 409b is optimally adjusted via the continuous position control of the flow adjustment valve 433. The gradual connection among the upper and lower chambers 409e and 409f and the reservoir 434 prevents an abrupt movement of the piston 409b which might cause a shock on the vehicle and noise.

Figure 15:
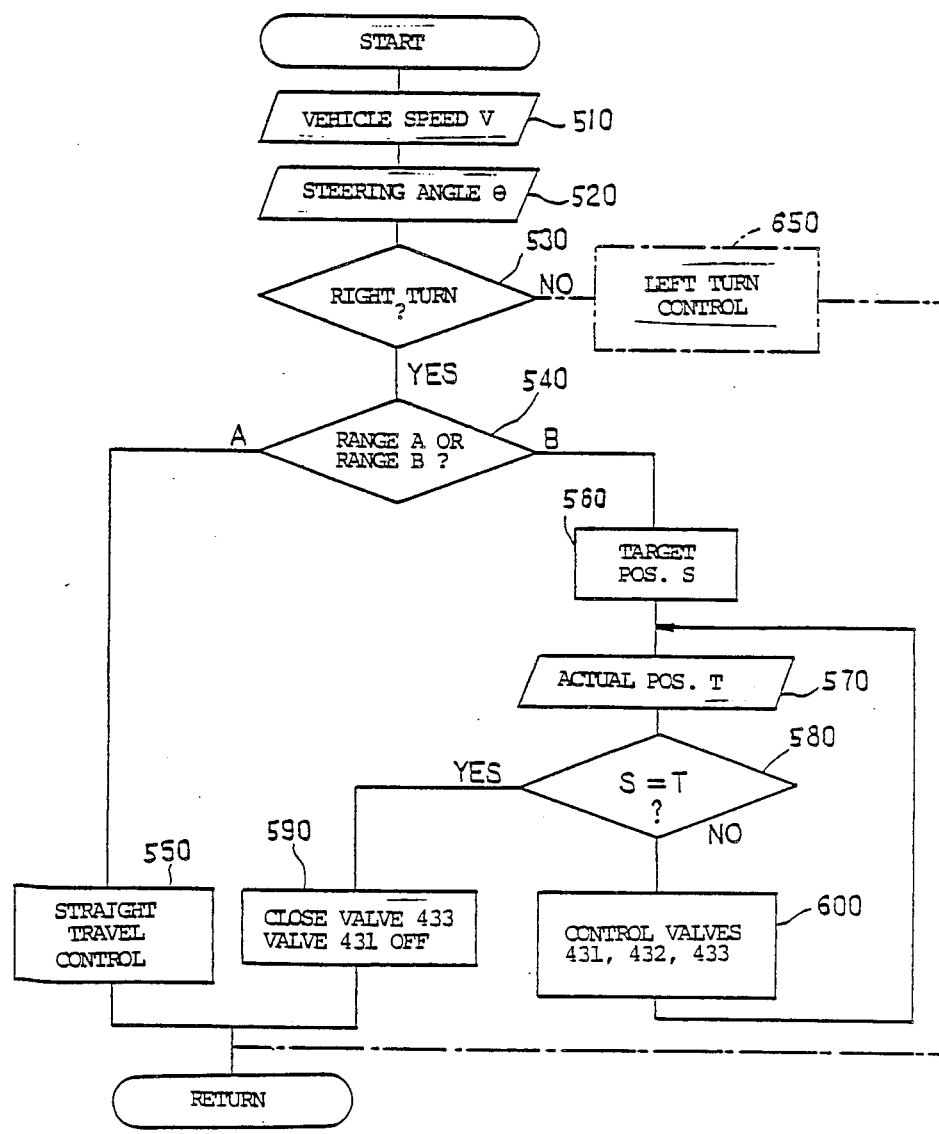
FIG. 15 is a flowchart of a program operating the electronic control unit of FIG. 14.

As described previously, the control unit 450 adjusts the control signals to the unloading valve 431, the change-over valve 432, and the flow adjustment valve 433 in accordance with the signals from the sensors 460, 462, and 464 by referring to a preset program. The control unit 450 includes a microcomputer system having the combination of an input circuit, a central processing unit, a read-only memory, a random-access memory, and an output circuit, as in the embodiment of FIGS. 1–12. The program operating the control unit 450 is stored in the read-only memory. FIG. 15 is a flowchart of this program. The program reiterates periodically.

As shown in FIG. 15, a first step 510 of the program reads the current vehicle speed V derived from the signal outputted by the vehicle speed sensor 460.

A step 520 following the step 510 reads the current steering angle $\theta$ derived from the signal outputted by the steering sensor 462.

A step 530 following the step 520 determines whether or not the vehicle is turning right, that is, turning clockwise, on the basis of the steering angle $\theta$ read in the preceding step 520. When the vehicle is turning right, the program advances to a step 540. When the vehicle is not turning right, the program advances to a block 650.

Figure 16:
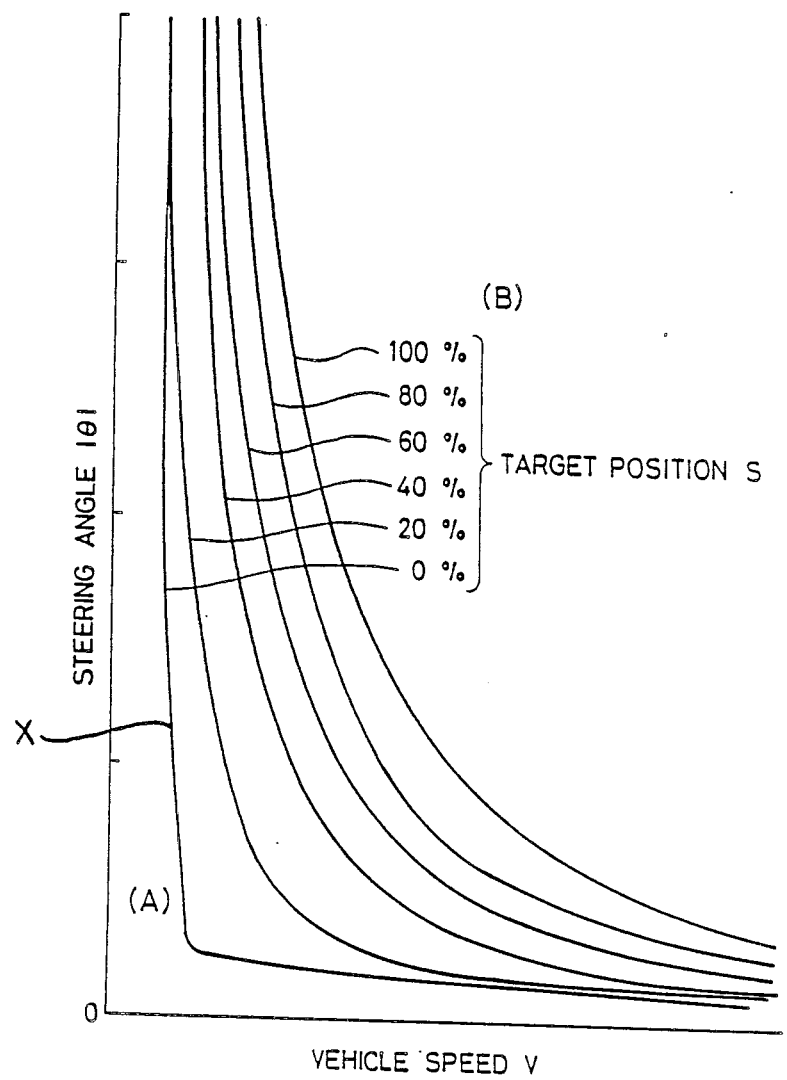
FIG. 16 is a graph showing the relationship among steering angle, vehicle speed, and target position of the cylinder unit in the stabilizer control unit of FIGS. 13 and 14.

The step 540 determines whether the vehicle speed V and the steering angle $\theta$ reside in a first preset range (A) or in a second preset range (B) by referring to a map shown in FIG. 16. It should be noted that this map is stored in the read-only memory within the control unit 450. In FIG. 16, the first range (A) extends leftward and downward of the boundary X while the second range (B) extends rightward and upward of the boundary X. The first range (A) corresponds to essentially straight travel conditions of the vehicle. The second range (B) corresponds to turn travel conditions of the vehicle. When the values V and $\theta$ reside in the straight travel range (A), the program advances to a step 550. When the values V and $\theta$ reside in the turn travel range (B), the program advances to a step 560.

The step 550 adjusts the control signals to the unloading valve 431, the change-over valve 432, and the flow adjustment valve 433 so that the piston 409b can move freely relative to the cylinder 409a of the hydraulic unit 409A. Accordingly, when the vehicle is travelling essentially straight, the cylinder unit 409A is free to move so that the stabilizer 401 is disabled. After the step 550, the current execution cycle of the program ends.

The step 560 determines a target position S of the piston 409b relative to the cylinder 409a of the hydraulic unit 409A in accordance with the vehicle speed V and the steering angle $\theta$. Specifically, the map of FIG. 16 holds values of the target position of the piston 409b which are plotted as a function of the vehicle speed and the steering angle. The target position S of the piston 409b is determined by referring to the map of FIG. 16. In FIG. 16, the target position of the piston 409b is represented by the ratio (%) of the target displacement to the maximal or full displacement of the piston 409b from its neutral or normal position. As understood from FIG. 16, the target position of the piston 409b moves from the neutral position to the maximally displaced position as the vehicle speed increases or as the steering angle moves from the neutral value. After the step 560, the program advances to a step 570.

It is preferable that the target position of the piston 409b continuously varies with the vehicle speed and the steering angle. In cases where the map of FIG. 16 holds several discrete target positions of the piston 409b as a function of the vehicle speed and the steering angle, the continuous variation in the target position of the piston 409b with the vehicle speed and the steering angle is obtained by interpolation.

The step 570 reads the current actual position T of the piston 409b derived from the signal outputted by the position sensor 464.

A step 580 following the step 570 determines whether or not the actual position T of the piston 409b essentially equals the target position S of the piston 409b. When the actual position T essentially equals the target position S, the program advances to a step 590. When the actual position T does not essentially equal the target position S, the program advances to a step 600.

The step 590 adjusts the control signal to the unloading valve 431 so that the valve 431 will assume the first position 431a. Also, the step 590 adjusts the control signal to the flow adjustment valve 433 so that the valve 433 will assume the second position 433b. Accordingly, when the actual position of the piston 409b essentially equals the target position of the piston 409b, the piston 409b of the cylinder unit 409A is fixed with respect to the cylinder 409a of the unit 409A. This operation allows the piston actual position to remain essentially equal to the piston target position. After the step 590, the current execution cycle of the program ends.

The step 600 adjusts the control signals to the unloading valve 431, the change-over valve 432, and the flow adjustment valve 433 in accordance with the difference between the actual position T and the target position S of the piston 409b so that the piston 409b will move toward the target position S. In this case, the direction of movement of the piston 409b depends on the sign of the difference between the actual position T and the target position S. In other words, the cylinder unit 409A selectively expands and contracts in accordance with the sign of the difference between the actual position T and the target position S. As a result of the processes in the steps 580 and 600, when the actual position of the piston 409b deviates from the target position, the piston 409b is moved toward the target position. After the step 600, the program returns to the step 570 and then proceeds to the step 580. Accordingly, the step 600 is cyclically reiterated and thus the piston 409b remains moved toward the target position until the piston 409b essentially reaches the target position. When the actual position of the piston 409b essentially reaches the target position as a result of the process in the step 600, the program advances from the step 580 to the step 590. In this way, the piston 409b is moved to and held in the target position.

As described previously, when the vehicle is not turning right, the program advances from the step 530 to the block 650. The block 650 includes steps to control the position and the state of the piston 409b of the cylinder unit 409A during a left or counterclockwise turn of the vehicle. These steps within the block 650 are designed and connected in a manner similar to the steps 540-600 related to a right or clockwise turn of the vehicle except for the following design change. Target positions of the piston 409b set in the step of the block 650 have the reverse or inverse relation with the target positions of the piston 409b set in the step 560. Accordingly, during a right turn of the vehicle, the piston 409b is moved to and held in the target position.

DESCRIPTION OF THE THIRD PREFERRED EMBODIMENT

Figure 17:
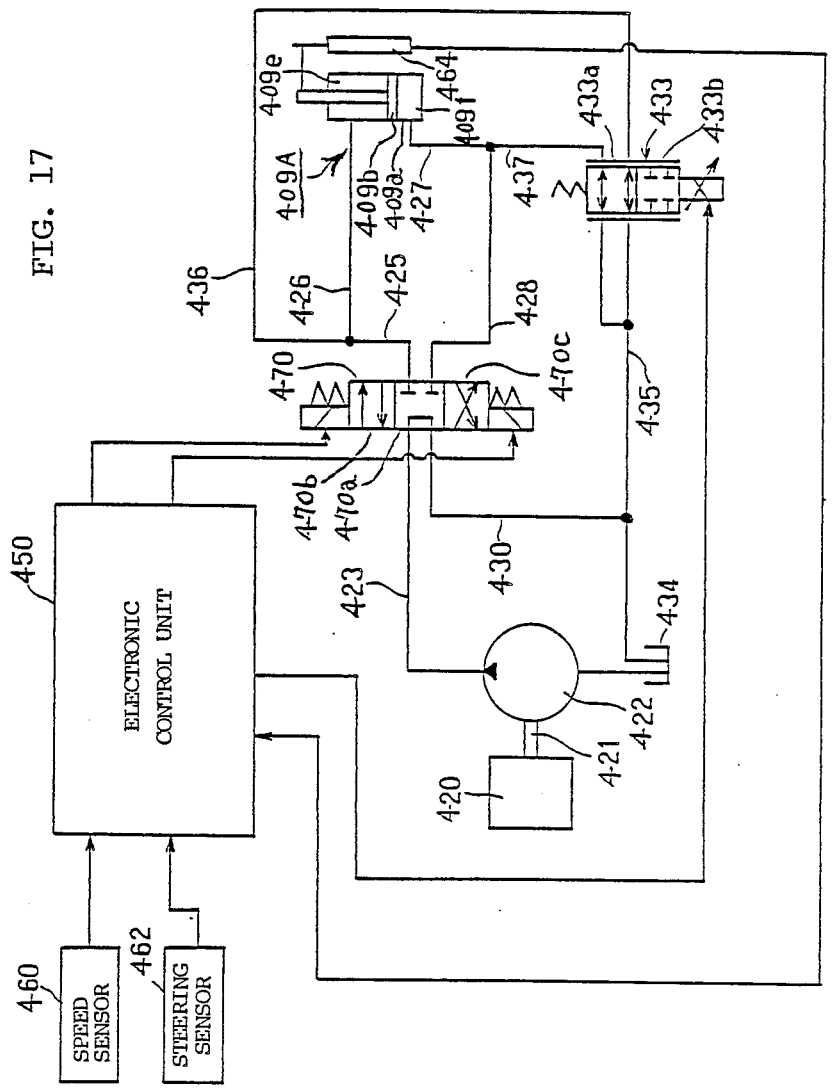
FIG. 17 is a schematic diagram of a stabilizer control system according to a third embodiment of this invention.

FIG. 17 shows a third embodiment of this invention which is similar to the embodiment of FIGS. 13-16 except for design changes described below.

As shown in FIG. 17, a four-port three-position solenoid valve 470 is used in place of the combination of the unloading valve 431 and the change-over valve 432 (see FIG. 14). The solenoid valve 470 is changeable among three positions 470a, 470b, and 470c. The solenoid valve 470 is electrically connected to the control unit 450. The solenoid valve 470 is adjusted by the control unit 450 via electric control signals transmitted from the unit 450 to the valve 470.

When the solenoid valve 470 assumes the first position 470a, the hydraulic cylinder unit 409A is disconnected from the outlet of the hydraulic pump 422 and the outlet of the hydraulic pump 422 is connected to the reservoir 434 so that the pressurized oil from the hydraulic pump 422 returns to the reservoir 434 and is not supplied to the cylinder unit 409A. Since the first position 470a of the solenoid valve 470 corresponds to the first position 431a of the unloading valve 431 (see FIG. 14), the solenoid valve 470 is changed to the first position 470a in place of a change of the unloading valve 431 to the first position 431a.

When the solenoid valve 470 assumes the second position 470b, the upper chamber 409e and the lower chamber 409f of the cylinder unit 409A are connected to the outlet of the hydraulic pump 422 and the reservoir 434 respectively so that the pressurized oil advances to the upper chamber 409e of the cylinder unit 409A and the oil escapes from the lower chamber 409f of the unit 409A to the reservoir 434. In this case, the piston 409b of the cylinder unit 409A is moved downward and thus the cylinder unit 409A is contracted. Since the second position 470b of the solenoid valve 470 corresponds to the first position 432a of the change-over valve 432, the solenoid valve 470 is changed to the second position 470b in place of a change of the change-over valve 432 to the first position 432a.

When the solenoid valve 470 assumes the third position 470c, the upper chamber 409e and the lower chamber 409f of the cylinder unit 409A are connected to the reservoir 434 and the outlet of the hydraulic pump 422 respectively so that the pressurized oil advances to the lower chamber 409f of the cylinder unit 409A and the oil escapes from the upper chamber 409e of the unit 409A to the reservoir 434. In this case, the piston 409b of the cylinder unit 409A is moved upward and thus the cylinder unit 409A is expanded. Since the third position 470c of the solenoid valve 470 corresponds to the second position 432b of the change-over valve 432, the solenoid valve 470 is changed to the third position 470c in place of a change of the change-over valve 432 to the second position 432b.

Since the second and third positions 470b and 470c of the solenoid valve 470 correspond to the second position 431a of the unloading valve 431 (see FIG. 14), the solenoid valve 470 is changed to the second position 470b or the third position 470c in place of a change of the unloading valve 431 to the second position 431b.

DESCRIPTION OF THE FOURTH PREFERRED EMBODIMENT

Figure 18:
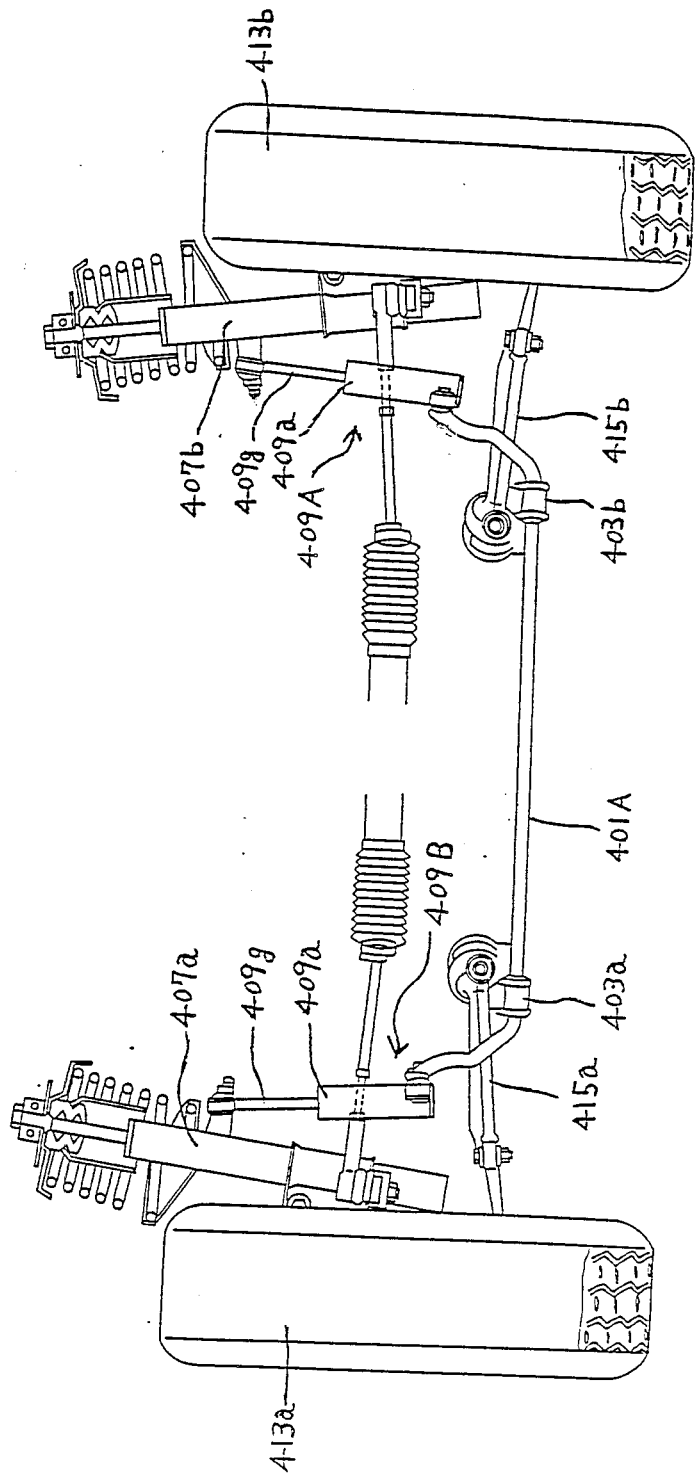
FIG. 18 is a diagram of a front portion of a vehicle equipped with a stabilizer control system according to a fourth embodiment of this invention.

FIG. 18 shows a fourth embodiment of this invention which is similar to the embodiment of FIGS. 13-16 except for design changes described below.

As shown in FIG. 18, a second hydraulic cylinder unit 409B is connected between the end 401a of the stabilizer 401A and the strut portion 407a in place of the tie rod 405a (see FIG. 13). The cylinder unit 409B is similar to the other cylinder unit 409A. The cylinder unit 409B has a cylinder 409a, a piston slideably disposed within the cylinder 409a and a rod 409g secured to the piston 409b and being movable together with the piston 409b. The cylinder 409a of the hydraulic unit 409B is connected to the stabilizer end 401a. The piston rod 409g of the cylinder unit 409B is connected to the strut portion 407a.

The cylinder unit 409B is hydraulically connected to the unloading valve 431 (see FIG. 14) via a change-over valve and a flow adjustment valve which are similar to the change-over valve 432 (see FIG. 14) and the flow adjustment valve 433 (see FIG. 14) respectively and which are adjustable via electrical signals outputted by the control unit 450 (see FIG. 14). The arrangement connected between the cylinder unit 409B and the unloading valve 431 and including the change-over valve and the flow adjustment valve is similar to the arrangement connected between the cylinder unit 409A and the unloading valve 431 and including the change-over valve 432 and the flow adjustment valve 433.

During essentially a straight travel of the vehicle, the cylinder unit 409B is controlled so as to allow essentially free movement of the piston 409b, as in the control of the cylinder unit 409A.

During a turn of the vehicle, the cylinder unit 409B is controlled in the reverse or opposite relation with the control of the cylinder unit 409A. Specifically, the fixed position of the piston 409b of the cylinder unit 409B moves toward the lower limit as the fixed position of the piston 409b of the cylinder unit 409A moves toward the upper limit. The fixed position of the piston 409b of the cylinder unit 409B moves toward the upper limit as the fixed position of the piston 409b of the cylinder unit 409A moves toward the lower limit.

This embodiment allows the length of the cylinder units 409A and 409B to equal essentially the half of the length of the cylinder unit 409A in the embodiment of FIGS. 13–16. This embodiment enables a well-balanced vehicle body.

DESCRIPTION OF THE FIFTH PREFERRED EMBODIMENT

Figure 19:
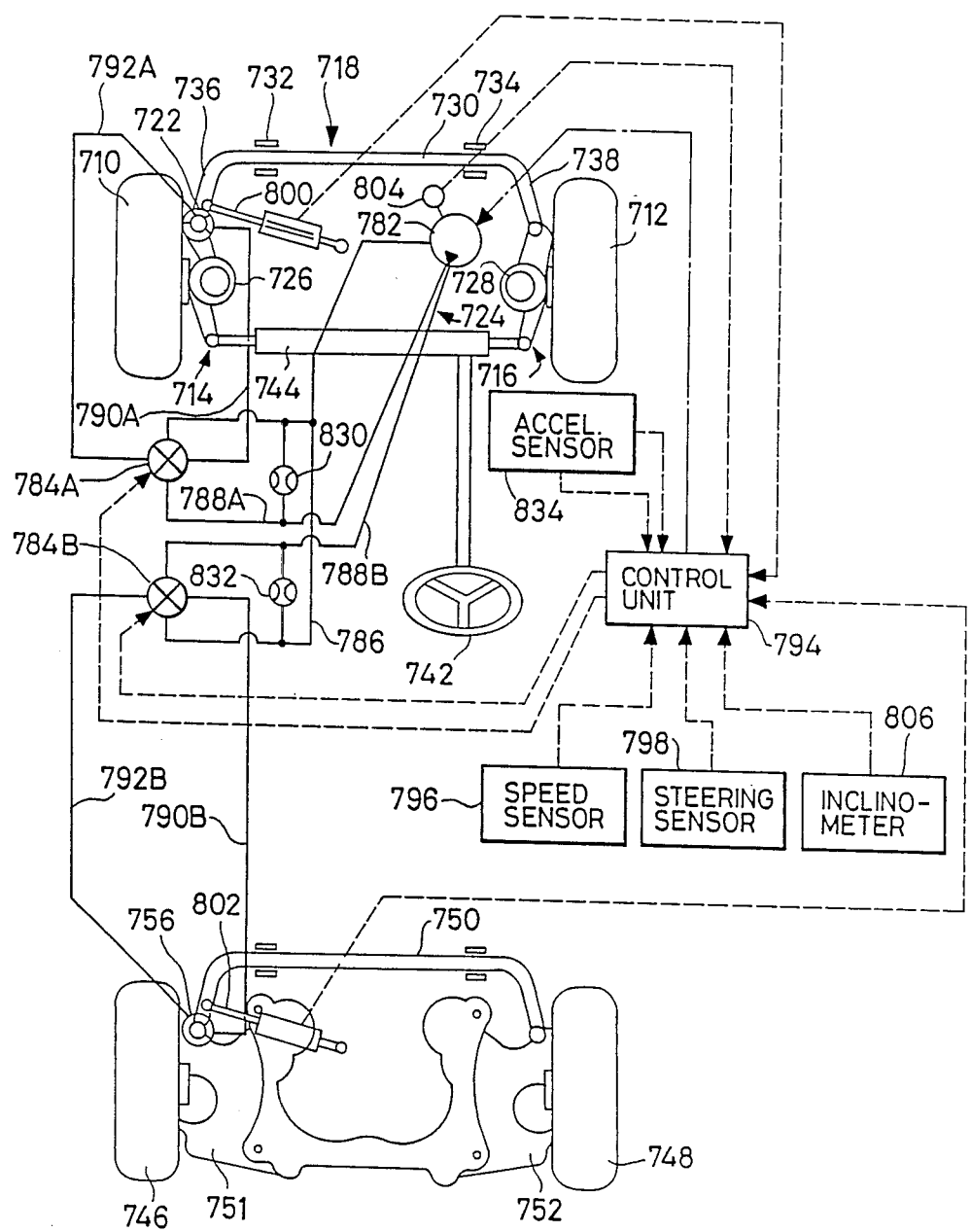
FIG. 19 is a diagram of a vehicle and a stabilizer control system according to a fifth embodiment of this invention.

With reference to FIG. 19, an automotive vehicle has a left-hand front wheel 710 and a right-hand front wheel 712 subjected to steering operation. The front wheels 710 and 712 are rotatably supported by spring lower members 714 and 716 respectively. The spring lower members 714 and 716 are supported on the vehicle body via shock absorbers 726 and 728. A front stabilizer 718 includes an elastic torsion bar 730 rotatably supported on the vehicle body via rubber bearings 732 and 734.

One end 736 of the stabilizer 718 is connected to the spring lower member 714 via a hydraulic cylinder unit 722. Specifically, this stabilizer end 736 is preferably connected to a strut portion of the shock absorber 726 or a suspension arm via the hydraulic cylinder unit 722. In this way, the hydraulic cylinder unit 722 is connected between the stabilizer 718 and a left-hand wheel suspension. The other end 738 of the stabilizer 718 is connected to the spring lower member 716 via a suitable member such as a tie rod. Specifically, this stabilizer end 738 is preferably connected to a strut portion of the shock absorber 728 or a suspension arm.

A steering wheel 742 is connected to a steering mechanism 744 which is connected in turn to the spring lower members 714 and 716.

The automotive vehicle has a left-hand rear wheel 746 and a right-hand rear 748 which are rotatably supported by spring lower members 751 and 752 and which are connected to the vehicle body via suspensions (not shown). One end of a rear stabilizer 750 is connected to the spring lower member 751 via a hydraulic cylinder unit 756 as in the case of the front stabilizer 718. The hydraulic cylinder unit 756 is connected between the stabilizer end and a left-hand vehicle wheel suspension. The other end of the rear stabilizer 750 is connected to the spring lower member 752 as in the case of the front stabilizer 718. The rear stabilizer 750 is designed in a manner similar to the front stabilizer 718.

The hydraulic cylinder units 722 and 756 are similar to the hydraulic cylinder units 9A and 9B in the embodiment of FIGS. 1–12.

A hydraulic arrangement 724 includes a hydraulic pump 782, four-port change-over solenoid valves 784A and 784B, pressure-relief or constant-pressure valves 830 and 832, and lines 786, 788A, 788B, 790A, 790B, 792A, and 792B. The hydraulic pump 782 is powered by an electric motor which is activated and deactivated via an electric signal outputted by an electronic control unit 794. The hydraulic pump 782 may be driven by an automotive engine, and may also be used in common to a power steering apparatus.

The hydraulic pump 782 has two outlets which are connected to the change-over valves 784A and 784B via the lines 788A and 788B respectively. The inlet of the hydraulic pump 782 is connected to the change-over valves 784A and 784B via the line 786. The lower chamber and the upper chamber of the front hydraulic cylinder unit 722 are connected to the change-over valve 784A via the lines 790A and 792A respectively. The lower chamber and the upper chamber of the rear hydraulic cylinder unit 756 are connected to the change-over valve 784B via the lines 790B and 792B respectively.

The pressure relief valve 830 is connected between the high pressure line 788A and the low pressure line 786 to prevent an excessive increase in the pressure at the line 788A. The pressure relief valve 832 is connected between the high pressure line 788B and the low pressure line 786 to prevent an excessive increase in the pressure the line 788B.

The change-over valve 784A is changeable among three positions. The position of the change-over valve 784A is changed via an electrical signal outputted by the control unit 794. When the change-over valve 784A assumes a first position corresponding to a fixing mode, the upper and lower chambers of the cylinder unit 722 are disconnected from each other so that the cylinder unit 722 is fixed. When the change-over valve 784A assumes a second position corresponding to an expansion mode, the lower chamber and the upper chamber of the cylinder unit 722 are connected to the high pressure line 788A and the low pressure line 786 respectively so that the piston rod of the cylinder unit 722 moves upward and thus the cylinder unit 722 expands. When the change-over valve 784A assumes a third position corresponding to a contraction mode, the upper chamber and the lower chamber of the cylinder unit 722 are connected to the high pressure line 788A and the low pressure line 786 respectively so that the piston rod of the cylinder unit 722 moves downward and thus the cylinder unit 722 contracts.

The change-over valve 784B is changeable among three positions. The position of the change-over valve 784B is changed via an electrical signal outputted by the control unit 794. When the change-over valve 784B assumes a first position corresponding to a fixing mode, the upper and lower chambers of the cylinder unit 756 are disconnected from each other so that the cylinder unit 756 is fixed. When the change-over valve 784B assumes a second position corresponding to an expansion mode, the lower chamber and the upper chamber of the cylinder unit 756 are connected to the high pressure line 788B and the low pressure line 786 respectively so that the piston rod of the cylinder unit 756 moves upward and thus the cylinder unit 756 expands. When the change-over valve 784B assumes a third position corresponding to a contraction mode, the upper chamber and the lower chamber of the cylinder unit 756 are connected to the high pressure line 788B and the low pressure line 786 respectively so that the piston rod of the cylinder unit 756 moves downward and thus the cylinder unit 756 contracts.

A speed sensor 796 generates a signal representative of the speed of the vehicle which is outputted to the control unit 794. A steering sensor 798 generates a signal representing the vehicle steering angle, that is, the operated angle or angular position of the steering wheel 742. This steering angle signal is transmitted to the control unit 796. It should be noted that the steering angle signal represents the value of steering displacement and also the direction of steering motion. A position sensor 800 connected to the front cylinder unit 722 generates a signal representing the position of the piston of the unit 722 relative to the cylinder of the unit 722, that is, representing the effective length of the unit 722. This piston position signal is transmitted to the control unit 794. A position sensor 802 connected to the rear cylinder unit 756 generates a signal representing the position of the piston of the unit 756 relative to the cylinder of the unit 756, that is, representing the effective length of the unit 756. This piston position signal is transmitted to the control unit 794. A pressure sensor 804 connected to the hydraulic pump 782 generates a signal representative of the oil pressure developed by the hydraulic pump 782. This pressure signal is transmitted to the control unit 794. An inclinometer 806 generates a signal representative of the inclination of the vehicle with respect to the normal lateral or transverse axis of the vehicle. This inclination signal is transmitted to the control unit 794. An acceleration sensor unit 834 generates a first signal representative of the lateral acceleration of the vehicle and a second signal representative of the longitudinal acceleration of the vehicle. These acceleration signals are transmitted to the control unit 794.

The longitudinal acceleration of the vehicle may be detected via a switch or position sensor responding to operation of a vehicle accelerator pedal or a vehicle brake pedal. The longitudinal acceleration of the vehicle may also be detected by calculating a variation in the vehicle speed for a fixed time interval. It should be noted that the vehicle speed is derived from the signal outputted by the vehicle speed sensor 796.

Figure 20:
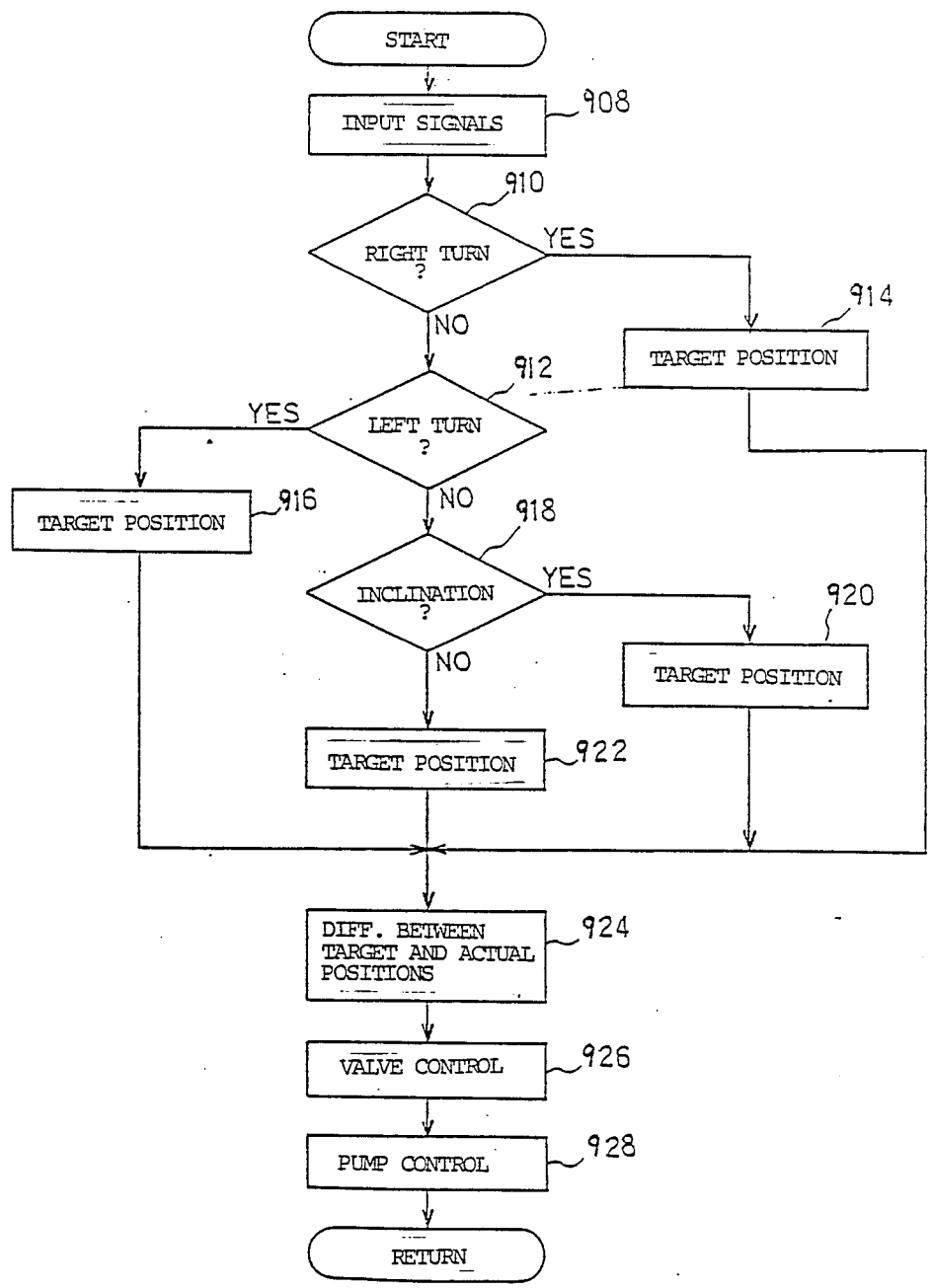
FIG. 20 is a flowchart of a program operating the electronic control unit of FIG. 19.

The control unit 794 adjusts the control signals to the change-over valves 784A and 784B in accordance with the signals from the sensors 796, 798, 800, 802, 804, 806, and 834 by referring to a preset program. The control unit 794 includes a microcomputer system having the combination of an input circuit, a central processing unit, a read-only memory, a random-access memory, and an output circuit, as in the embodiment of FIGS. 1-12. The program operating the control unit 794 is stored in the read-only memory. FIG. 20 is a flowchart of this program. The program reiterates periodically.

As shown in FIG. 20, a first step 908 of the program derives the vehicle speed, the steering angle, the piston position of the front cylinder unit 722, the piston position of the rear cylinder unit 756, the oil pressure, the inclination of the vehicle, the lateral acceleration of the vehicle, and the longitudinal acceleration of the vehicle from the signals outputted by the sensors 796, 798, 800, 802, 804, 806, and 834.

A step 910 following the step 908 determines whether or not the vehicle is turning right, that is, turning clockwise, in accordance with the steering angle. When the vehicle is turning right, the program advances to a step 914. When the vehicle is not turning right, the program advances to a step 912.

The step 912 determines whether or not the vehicle is turning left, that is, turning counterclockwise, in accordance with the steering angle. When the vehicle is turning left, the program advances to a step 916. When the vehicle is not turning left, the program advances to a step 918.

Accordingly, when the vehicle is turning right and left, the program advances to the steps 914 and 916 respectively. When the vehicle is travelling straight, the program advances to the step 918.

The steps 914 and 916 determine target lengths or target piston positions of the cylinder units 722 and 756 in accordance with the vehicle operating conditions including the steering angle and the vehicle speed. The target lengths of the cylinder units 722 and 756 are chosen to adequately reduce or prevent roll of the vehicle during turn of the vehicle. The target lengths of the cylinder units 722 and 756 preferably vary with the centrifugal force acting on the vehicle during turn of the vehicle. Specifically, these target lengths are preferably determined on the basis of functions which are inversely proportional to the turning radius of the vehicle derived from the steering angle and which are proportional to the square of the vehicle speed. After the steps 914 and 916, the program advances to a step 924.

In more detail, when the vehicle is turning right, the target lengths of the cylinder units 722 and 756 are set greater than their neutral lengths by values corresponding to the centrifugal force acting on the vehicle. When the vehicle is turning left, the target lengths of the cylinder units 722 and 756 are set smaller than their neutral lengths by values corresponding to the centrifugal force acting on the vehicle.

The steps 714 and 716 also vary the target lengths of the cylinder units 722 and 756 in accordance with the longitudinal acceleration and the lateral acceleration of the vehicle. Specifically, the target length of the front cylinder unit 722 and the target length of the rear cylinder unit 756 are varied relative to each other in accordance with the longitudinal acceleration. In more detail, during a positive acceleration of the vehicle under a turn, the relative variation of the target lengths of the cylinder units 722 and 756 are chosen to enhance the anti-rolling effect of the rear stabilizer 750 relative to that of the front stabilizer 718. During a negative acceleration or a deceleration of the vehicle under a turn, the relative variation of the target lengths of the cylinder units 722 and 756 are chosen to enhance the anti-rolling effect of the front stabilizer 718 relative to that of the rear stabilizer 750.

Furthermore, the steps 714 and 716 use the lateral acceleration to detect counter-steering operation in which the direction of the turn disagrees with the direction of the lateral acceleration. During counter-steering operation, the target lengths of the cylinder units 722 and 756 are varied with the degree of the counter-steering operation so that the attitude or position of the vehicle can be maintained in an acceptable range.

The step 918 determines whether or not the inclination of the vehicle is smaller than a preset reference angle. When the inclination of the vehicle is smaller than the preset angle, that is, when the vehicle essentially does not incline, the program advances a step 922. When the inclination of the vehicle is equal to or greater than the preset reference angle, that is, when the vehicle appreciably inclines, the program advances to a step 920.

The step 920 determines target lengths or target piston positions of the cylinder units 722 and 756 in accordance with the inclination of the vehicle. Specifically, in the case of an inclination where the right-hand side of the vehicle is higher than the left-hand side of the vehicle, the target lengths of the cylinder units 722 and 756 are set relatively large to cancel the inclination. In the case of an opposite inclination, the target lengths of the cylinder units 722 and 756 are set relatively small to cancel the inclination. After the step 920, the program advances to the step 924.

The step 922 sets target lengths or target piston positions of the cylinder units 722 and 756 equal to preset neutral values. Accordingly, when the vehicle is travelling essentially straight and essentially does not incline, the target lengths of the cylinder units 722 and 756 are held in their neutral values. After the step 922, the program advances to the step 924.

The step 924 calculates the differences between the target lengths and the actual lengths of the cylinder units 722 and 756 detected via the position sensors 800 and 802.

A step 926 following the step 924 adjusts the change-over valves 784A and 784B in accordance with the differences between the target lengths and the actual lengths of the cylinder units 722 and 756. Specifically, when the difference between the target length and the actual length of the front cylinder unit 722 remains within a preset tolerance or allowable error, the front change-over valve 784A is changed to or held in the fixing mode position so that the cylinder unit 722 is fixed at the current length. When the actual length of the front cylinder unit 722 is greater than the target length by a value exceeding the preset tolerance, the change-over valve 784A is changed to or held in the contraction mode position so that the cylinder unit 722 is contracted. When the actual length of the front cylinder unit 722 is smaller than the target length by a value exceeding the preset tolerance, the change-over valve 784A is changed to or held in the expansion mode position so that the cylinder unit 722 is expanded. The rear change-over valve 784B is adjusted in accordance with the difference between the target length and the actual length of the rear cylinder unit 756 in a way similar to the adjustment of the front change-over valve 784A.

A step 928 following the step 926 adjusts the hydraulic pump 782 in accordance with the oil pressure detected by the pressure sensor 804. Specifically, the hydraulic pump 782 is adjusted so as to maintain the oil pressure in a preset acceptable range. After the step 928, the current execution cycle of the program ends.

The periodical reiteration of the program enables the actual lengths of the cylinder units 722 and 756 to follow or equal the target lengths of the cylinder units 722 and 756.

Accordingly, during a right turn of the vehicle, the cylinder units 722 and 756 are generally expanded from their neutral lengths so that the stabilizers 718 and 750 are twisted in the directions of reducing or preventing the roll of the vehicle. During a left turn of the vehicle, the cylinder units 722 and 756 are generally contracted from their neutral lengths so that the stabilizers 718 and 750 are twisted in the directions of reducing or preventing the roll of the vehicle.

During essentially straight travel of the vehicle, inclination of the vehicle is prevented or reduced. Furthermore, the stabilizers 718 and 750 produce their original or normal performances.

DESCRIPTION OF THE SIXTH PREFERRED EMBODIMENT

Figure 21:
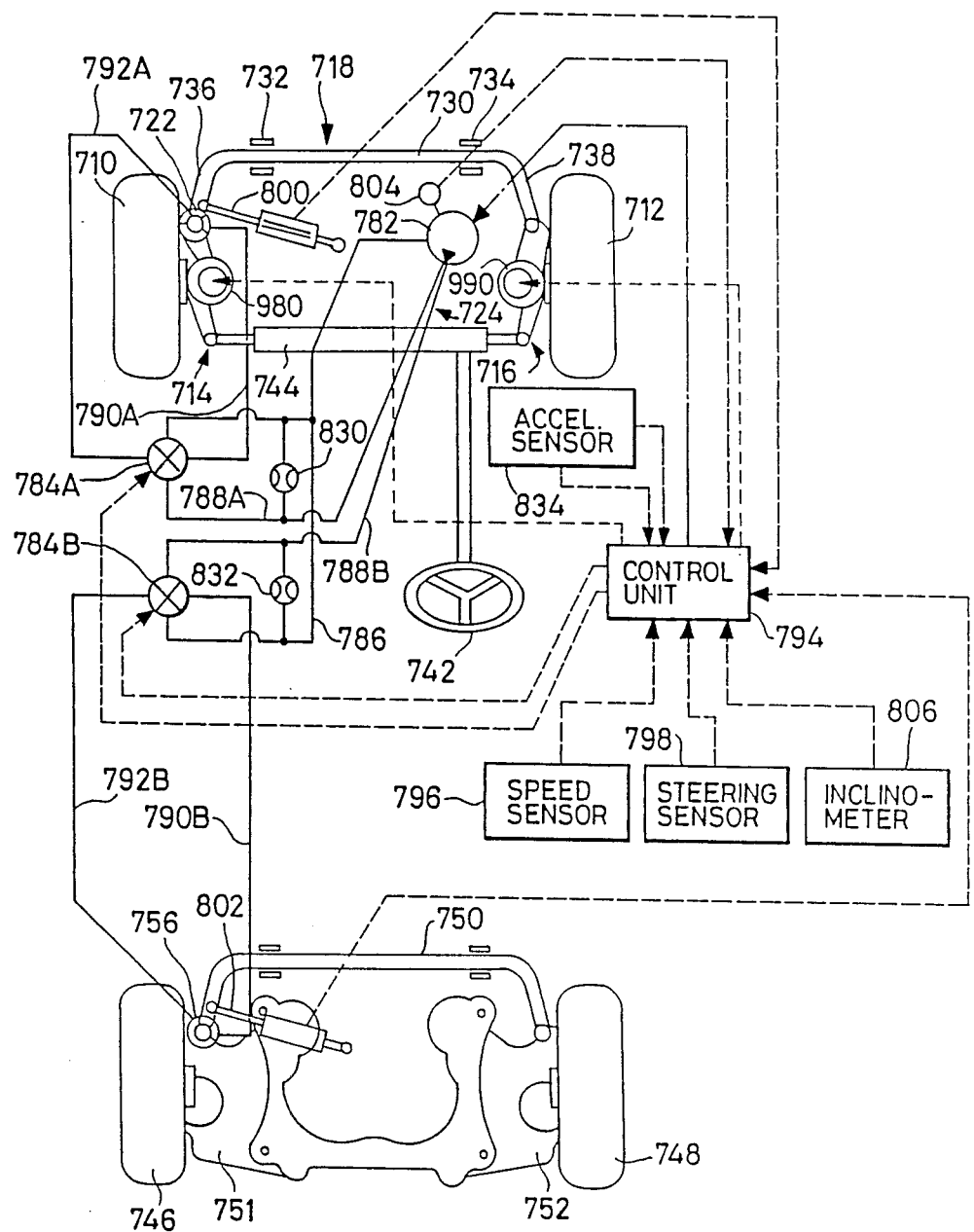
FIG. 21 is a diagram of a vehicle and a stabilizer control system according to a sixth embodiment of this invention.

FIG. 21 shows a sixth preferred embodiment of this invention which is similar to the embodiment of FIGS. 19 and 20 except for design changes described hereinafter.

Shock absorbers 980 and 990 of vehicle front wheel suspensions have adjustable damping factors. The shock absorbers 980 and 990 are preferably of the type in which the diameter of a flow control orifice is variable to adjust the damping factor. The shock absorbers 980 and 990 are electrically connected to the electric control unit 794. The damping factors of the shock absorbers 980 and 990 are adjusted via electrical signals outputted from the control unit 794 to the shock absorbers 980 and 990.

During a left turn or right turn of the vehicle, the control unit 794 adjusts the shock absorbers 980 and 990 so that their damping factors will increase. Specifically, the steps 114 and 116 of the control program (see FIG. 20) are modified to adjust the shock absorbers 980 and 990 to increase their damping factors. The increased damping factors of the shock absorbers 980 and 990 more effectively reduce or prevent roll of the vehicle during the turn.

Shock absorbers of vehicle rear wheel suspensions may be of the same type as the front shock absorbers 980 and 990. In this case, the rear shock absorbers are controlled in a way similar to the control of the rear shock absorbers 980 and 990.

What is claimed is:

1. A control system for a vehicle having a right-hand wheel, a left-hand wheel, a first spring lower member connected to the right-hand wheel, and a second spring lower member connected to the left-hand wheel, the control system comprising:
    (a) means for generating pressurized hydraulic fluid;
    (b) an elastically twistable stabilizer connected between the first and second spring lower members;
    (c) a hydraulic actuator, connected to the generating means and connected between the stabilizer and at least one of the spring lower members, for twisting the stabilizer when the actuator is supplied with the pressurized fluid and for deactivating the first and second spring lower members when the actuator is not supplied with the pressurized fluid;
    (d) means for detecting a speed and steering angle of the vehicle;
    (e) control means for determining whether the vehicle is travelling in a substantially straight direction or turning, in accordance with the detected vehicle steering angle, for supplying the pressurized fluid to the actuator to repress roll of the vehicle when the vehicle is turning, and for interrupting the supply of the pressurized fluid to the actuator and thereby disconnecting the first and second spring lower members when the vehicle is travelling essentially straight;
    (f) a valve connected between the generating means and the hydraulic actuator for controlling a supply of the pressurized fluid to the hydraulic actuator; and
    (g) sensor means, directly connected to the hydraulic actuator, for producing and outputting a sensor output signal representative of a condition of the hydraulic actuator;

wherein the control means comprises means for determining an actual operation quantity of the hydraulic actuator in accordance with the sensor output signal, means for calculating a target operation quantity of the hydraulic actuator on the basis of the detected vehicle speed and the detected vehicle steering angle, and means for controlling the valve in accordance with the actual and target operation quantities of the hydraulic actuator to cause the actual operation quantity of the hydraulic actuator to approach the target operation quantity of the hydraulic actuator, and thereby to repress roll of the vehicle when the vehicle is turning.

2. The control system of claim 1 wherein the valve holds the hydraulic actuator fixed when the actual operation quantity of the hydraulic actuator becomes equal to the target operation quantity of the hydraulic actuator.

3. The control system of claim 1 wherein the control means includes means for controlling the valve using a control signal having a variable duty cycle, the supply of the pressurized fluid to the hydraulic actuator being controlled continuously in accordance with the duty cycle of the control signal.

4. A control system for a vehicle having a right-hand wheel, a left-hand wheel, a first spring lower member connected to the right-hand wheel, and a second spring lower member connected to the left-hand wheel, the control system comprising:
   (a) means for generating pressurized hydraulic fluid;
   (b) an elastically twistable stabilizer connected between the first and second spring lower members, the stabilizer having a portion transmitting a torsional force;
   (c) a hydraulic cylinder unit connected to the generating means and connected between the torsion-force-transmission portion of the stabilizer and at least one of the spring lower members, the hydraulic cylinder unit being allowed to be expanded and contracted when the hydraulic cylinder unit is supplied with the pressurized fluid, the hydraulic cylinder unit being allowed to freely expand and contract when the cylinder unit is not supplied with the pressurized fluid;
   (d) means for detecting a travelling condition of the vehicle; and
   (e) control means for determining whether the vehicle is travelling essentially straight or turning in accordance with the detected vehicle travelling condition, for controlling a supply of the pressurized fluid to the hydraulic cylinder unit to repress roll of the vehicle when the vehicle is turning, and for interrupting the supply of the pressurized fluid to the cylinder unit and thereby producing a free expansion and contraction of the hydraulic cylinder unit when the vehicle is travelling substantially straight, wherein the vehicle travelling condition includes an angular position of a vehicle steering wheel and a speed of the vehicle, and wherein the control means determines a speed of variation in the angular position of the vehicle steering wheel, and determines whether the angular position variation speed and the vehicle speed are in a preset steering slow-change range or in a preset steering rapid-change range, and said control means including means for controlling a supply of the pressurized fluid to the hydraulic cylinder unit in a way which depends on whether the angular position variation speed and the vehicle speed reside in the steering slow-change range or in the steering rapid-change range wherein when the angular position variation speed and the vehicle speed reside in the steering rapid-change range, the hydraulic cylinder unit is selectively fixed in a neutral position, a fully expanded position, and a fully contracted position in accordance with the angular position of the vehicle steering wheel, the angular position variation speed of the vehicle steering wheel, and the vehicle speed.

5. The control system of claim 4 further comprising a shock absorber having an adjustable damping factor, connected to one of the spring lower members and wherein the control means is operative to adjust the damping factor of the shock absorber in accordance with the vehicle travelling condition.

6. The control system of claim 4 wherein the vehicle has a second right-hand wheel, a second left-hand wheel, a third spring lower member connected to the second right-hand wheel, and a fourth spring lower member connected to the second left-hand wheel, and further comprising a second elastically twistable stabilizer connected between the third and fourth spring lower members, the second stabilizer having a portion transmitting a torsional force, and a second hydraulic cylinder unit connected to the generating means and connected between tho torsional-force-transmission portion of the second stabilizer and at least one of the third and fourth spring lower members, the second hydraulic cylinder unit being allowed to be expanded and contracted when the second cylinder unit is supplied with the pressurized fluid, the second hydraulic cylinder unit being allowed to freely expand and contract when the second cylinder unit is not supplied with the pressurized fluid, wherein the control means is operative to control supply of the pressurized fluid to the second cylinder unit to repress roll of the vehicle when the vehicle is turning, and is operative to interrupt the supply of the pressurized fluid to the second cylinder unit and thereby to produce free expansion and contraction of the second cylinder unit when the vehicle is travelling straight, and wherein the control means is operative to control the first and second cylinder units independent of each other.

7. The control system of claim 6 wherein the first right-hand vehicle wheel and the first left-hand vehicle wheel correspond to vehicle front wheels, and the second right-hand vehicle wheel and the second left-hand vehicle wheel correspond to vehicle rear wheels, and further comprising means for detecting variation in the speed of the vehicle, and wherein the control means is operative to control the first and second cylinder units in different ways when the variation in the vehicle speed is detected and the vehicle is turning.

8. The control system of claim 7 wherein when an increasing variation in the vehicle speed is detected, the second cylinder unit is controlled at a degree greater than a degree of the control of the first cylinder unit.

9. The control system of claim 7 wherein when a decreasing variation in the vehicle speed is detected, the first cylinder unit is controlled at a degree greater than a degree of the control of the second cylinder unit.

10. The control system of claim 4 further comprising means for detecting a lateral acceleration of the vehicle, and wherein the control means is operative to control the cylinder unit in accordance with the detected lateral acceleration of the vehicle.

11. A control system for a vehicle having a right-hand wheel, a left-hand wheel, a first spring lower member connected to the right-hand wheel, and a second spring lower member connected to the left-hand wheel, the control system comprising:
 (a) means for generating pressurized hydraulic fluid;
 (b) an elastically twistable stabilizer connected between the first and second spring lower members, the stabilizer having a portion transmitting a torsional force;
 (c) a hydraulic cylinder unit connected to the generating means and connected between the torsion-force-transmission portion of the stabilizer and at least one of the spring lower members, the hydraulic cylinder unit being allowed to be expanded and contracted when the hydraulic cylinder unit is supplied with the pressurized fluid, the hydraulic cylinder unit being allowed to freely expand and contract when the cylinder unit is not supplied with the pressurized fluid;
 (d) means for detecting a travelling condition of the vehicle; and
 (e) control means for determining whether the vehicle is travelling essentially straight or turning in accordance with the detected vehicle travelling condition, for controlling a supply of the pressurized fluid to the hydraulic cylinder unit to repress roll of the vehicle when the vehicle is turning, and for interrupting the supply of the pressurized fluid to the hydraulic cylinder unit and thereby producing a free expansion and contraction of the hydraulic cylinder unit when the vehicle is travelling substantially straight, wherein the vehicle cylinder unit includes a hollow cylinder and a piston movably disposed within the cylinder and separating an interior of the cylinder into a first chamber and a second chamber, the cylinder being connected to the stabilizer, the piston being connected to one of the spring lower members, wherein the control means comprises an unloading valve, a change-over valve, and a flow adjustment valve, the unloading valve selectively allowing and interrupting the supply of the pressurized fluid to the cylinder unit when the unloading valve changes between a first position and a second position respectively, the change-over valve selectively directing the pressurized fluid to either of the first and second chambers when the change-over valve changes between a first position and a second position, the flow adjustment valve connecting and disconnecting the first and second chambers when the flow adjustment valve changes between a first position and a second position.

12. The control system of claim 11 wherein the change-over valve is continuously changed between its first position and its second position.

13. The control system of claim 11 wherein the adjustment valve is continuously changed between its first position and its second position.

14. The control system of claim 11 wherein the control means continuously varies an effective length of the cylinder unit in accordance with the detected vehicle travelling condition.

15. A control system for a vehicle having a right-hand wheel, a left-hand wheel, a first spring lower member connected to the right-hand wheel, and a second spring lower member connected to the left-hand wheel, the control system comprising:
 (a) means for generating pressurized hydraulic fluid;
 (b) an elastically twistable stabilizer connected between the first and second spring lower members, the stabilizer having a portion transmitting a torsional force;
 (c) a hydraulic cylinder unit connected to the generating means and connected between the torsion-force-transmission portion of the stabilizer and at least one of the spring lower members, the hydraulic cylinder unit including a cylinder and a piston movably disposed within the cylinder, the piston dividing an interior of the cylinder into a first chamber and a second chamber, wherein a distance between the spring lower member and the torsion-force-transmission portion of the stabilizer is adjustable in accordance with movement of the piston;
 (d) a first hydraulic line connecting the generating means and the first chamber of the cylinder unit, a second hydraulic line connecting the generating means and the second chamber of the cylinder unit, and a third hydraulic line connecting the first and second chambers of the cylinder unit;
 (e) a change-over valve provided in the first and second hydraulic lines and being changeable among an expansion mode position, a neutral mode position, and a contraction mode position, wherein the cylinder unit expands and contracts when the change-over valve assumes the expansion mode position and the contraction mode position respectively, and the cylinder unit is allowed to be fixed when the change-over valve assumes the neutral mode position;
 (f) a connection-disconnection valve provided in the third line and blocking and unblocking the third line;
 (g) means for detecting speed of the vehicle;
 (h) means for detecting steering angle of the vehicle; and
 (i) means for controlling the change-over valve and the connection-disconnection valve in accordance with the detected vehicle speed and the detected vehicle steering angle.

16. A control system for a vehicle having a right-hand wheel, a left-hand wheel, a first spring lower member connected to the right-hand wheel, and a second spring lower member connected to the left-hand wheel, the control system comprising:
 (a) an elastically twistable stabilizer connected between the first and second spring lower members;
 (b) a single-rod-type hydraulic actuator having a first chamber and a second chamber, the hydraulic actuator twisting the stabilizer in accordance with pressures in the first and second chambers;
 (c) means for generating pressurized hydraulic fluid;
 (d) a change-over valve supplying the pressurized hydraulic fluid to either of the first and second chambers of the hydraulic actuator; and
 (e) a flow adjustment valve changeable between a connection mode position and a disconnection mode position, wherein the flow adjustment valve connects the first and second chambers of the hydraulic actuator to each other and connects the first and second chambers of the hydraulic actuator to a low pressure side when the flow adjustment valve assumes the connection mode position, wherein the flow adjustment valve disconnects the first and second chambers of the hydraulic actuator from each other and disconnects the first and second chambers of the hydraulic actuator from the low pressure side, and wherein the flow adjustment valve gradually changes between the connection mode position and the disconnection mode position during adjustment of flows of the hydraulic fluid from and to the actuator.

17. The control system of claim 16 wherein the flow adjustment valve is of a solenoid type and is driven by an electric pulse signal having a variable duty cycle, the flow adjustment valve gradually reduces the flow of the hydraulic fluid from the first and second chambers of the hydraulic actuator to the low pressure side in accordance with variation in the duty cycle of the pulse signal.

18. A control system for a vehicle having a body, a right-hand wheel, a left-hand wheel, a first device rotatably connecting the right-hand wheel to the body, and a second device rotatably connecting the left-hand wheel to the body, the control system comprising:

(a) an elastically twistable stabilizer connected between the first and second connecting devices;
(b) an actuator connected between the stabilizer and one of the first and second connecting devices and deforming the stabilizer as a state of the actuator varies;
(c) sensor means for detecting an actual state of the actuator;
(d) means for determining a target state of the actuator; and
(e) means for controlling the actuator in accordance with the actual and target states of the actuator to cause the actual state of the actuator to approach the target state of the actuator.

19. The control system of claim 18 further comprising means for detecting an operating condition of the vehicle, and means for varying the target state of the actuator in accordance with the detected vehicle operating condition.

* * * * *